(12) United States Patent
Hashizume et al.

(10) Patent No.: US 7,066,145 B2
(45) Date of Patent: Jun. 27, 2006

(54) INTAKE AIR AMOUNT CONTROL APPARATUS AND INTAKE AIR AMOUNT CONTROL METHOD FOR INTERNAL COMBUSTION ENGINES

(75) Inventors: Akira Hashizume, Yokohama (JP); Keizo Hiraku, Aichi-ken (JP); Hirohiko Yamada, Okazaki (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 10/921,219

(22) Filed: Aug. 19, 2004

(65) Prior Publication Data

US 2005/0039710 A1    Feb. 24, 2005

(30) Foreign Application Priority Data

Aug. 21, 2003    (JP)    ............................. 2003-297319

(51) Int. Cl.
   *F02D 11/10*    (2006.01)
   *F02M 25/07*    (2006.01)
   *F01L 1/34*    (2006.01)

(52) U.S. Cl. ................ 123/399; 123/568.14; 123/90.16

(58) Field of Classification Search .. 123/90.11–90.18, 123/396, 399, 198 D, 403, 405, 568.14
See application file for complete search history.

(56) References Cited

U.S. PATENT DOCUMENTS

| 6,178,934 | B1 * | 1/2001 | Hirasawa et al. | ........ 123/90.15 |
|---|---|---|---|---|
| 6,491,022 | B1 * | 12/2002 | Okamoto | ..................... 123/396 |
| 2002/0072837 | A1 | 6/2002 | Eichenseher et al. | |
| 2003/0019475 | A1 * | 1/2003 | Machida et al. | ............ 123/405 |

FOREIGN PATENT DOCUMENTS

| JP | 08-177434 | | 7/1996 | |
|---|---|---|---|---|
| JP | 2000-110528 | | 4/2000 | |
| JP | 2000-130196 | | 5/2000 | |
| JP | 2000161124 | A * | 6/2000 | ............. 123/90.16 |
| JP | 2001-303999 | | 10/2001 | |
| JP | 2002-542421 | | 12/2002 | |
| JP | 2003083149 | A * | 3/2003 | ............. 123/90.16 |
| WO | WO 00/63535 | | 10/2000 | |

OTHER PUBLICATIONS

German Version of German Office Action, 10 2004 040 537.9-13, issued Dec. 5, 2005.
English Translation of German Office Action, 10 2004 040 537.9-13, issued Dec. 5, 2005.

* cited by examiner

Primary Examiner—Willis R. Wolfe, Jr.
(74) Attorney, Agent, or Firm—Kenyon & Kenyon LLP

(57) ABSTRACT

If a valve timing adjusting mechanism has a problem, an ECU determines whether or not actual valve timing VTa is larger than valve timing advanced angle limit value VTegr. Depending on the determination, the ECU selects a value for target valve operating angle VLt from safety angles including intermediate valve operating angle VLmid and maximum valve operating angle VLmax. Each of the safety angles VLmid, VLmax is a valve operating angle at which engine combustion is stabilized at the current valve timing. With the valve operating angle fixed at the safety angle VLmid or VLmax, a throttle valve controls intake air amount. This prevents the engine combustion from becoming unstable, thus enabling the engine to be operated in an engine safety mode.

15 Claims, 23 Drawing Sheets

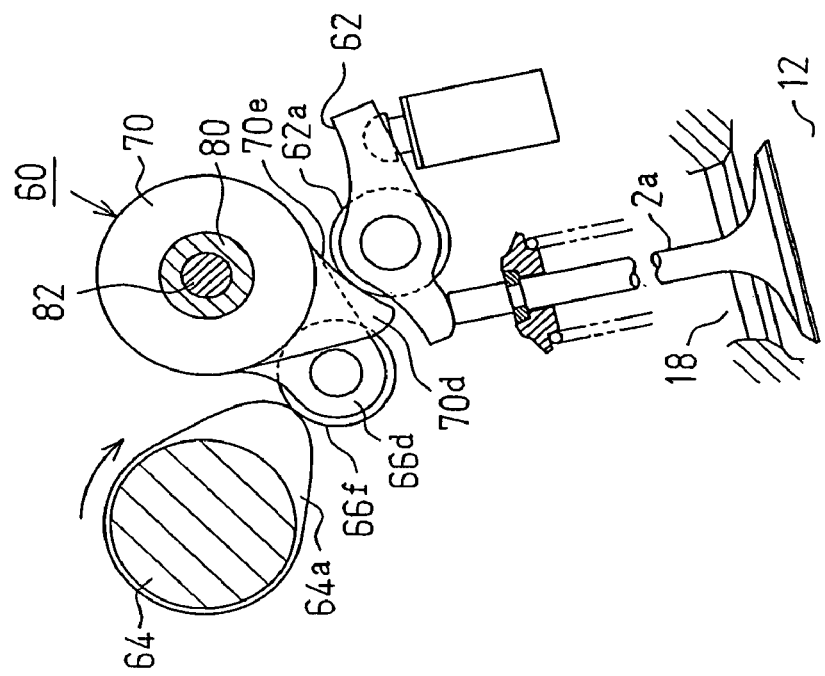
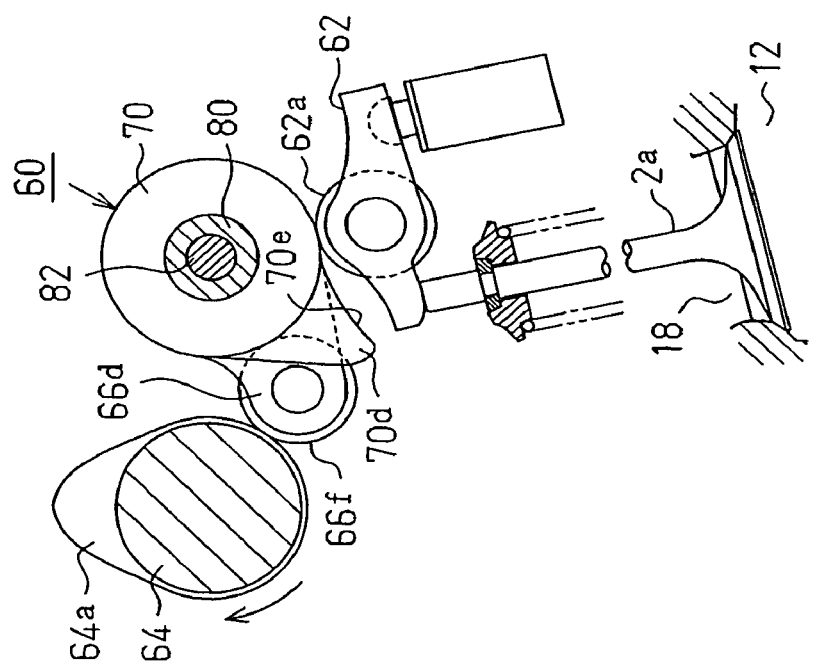
Fig. 6(A)
Fig. 6(B)

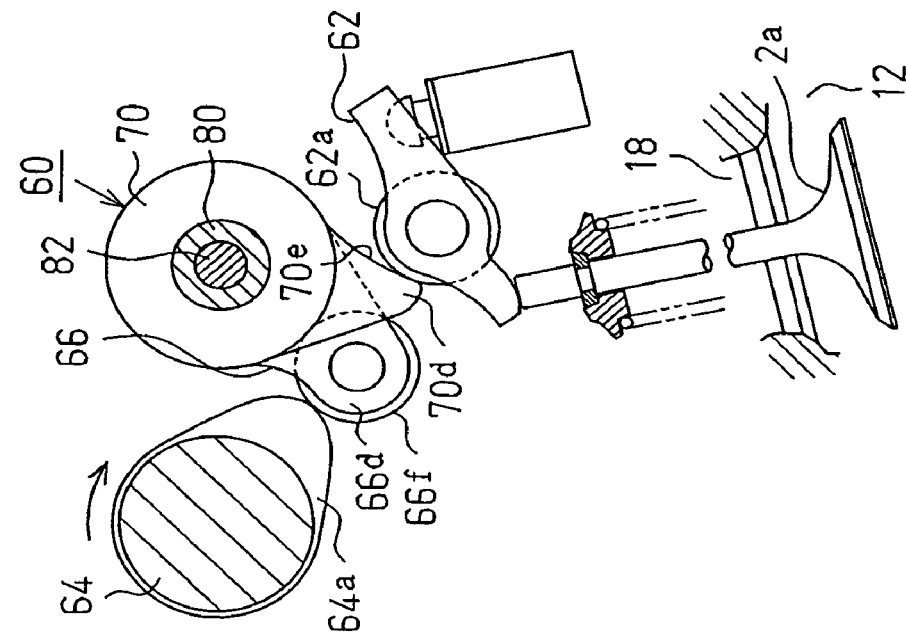
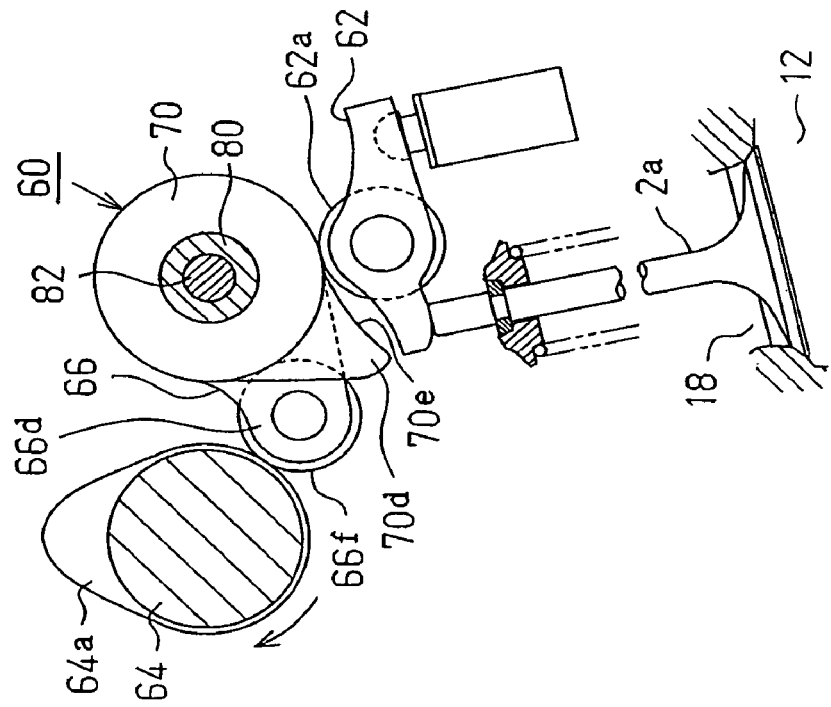

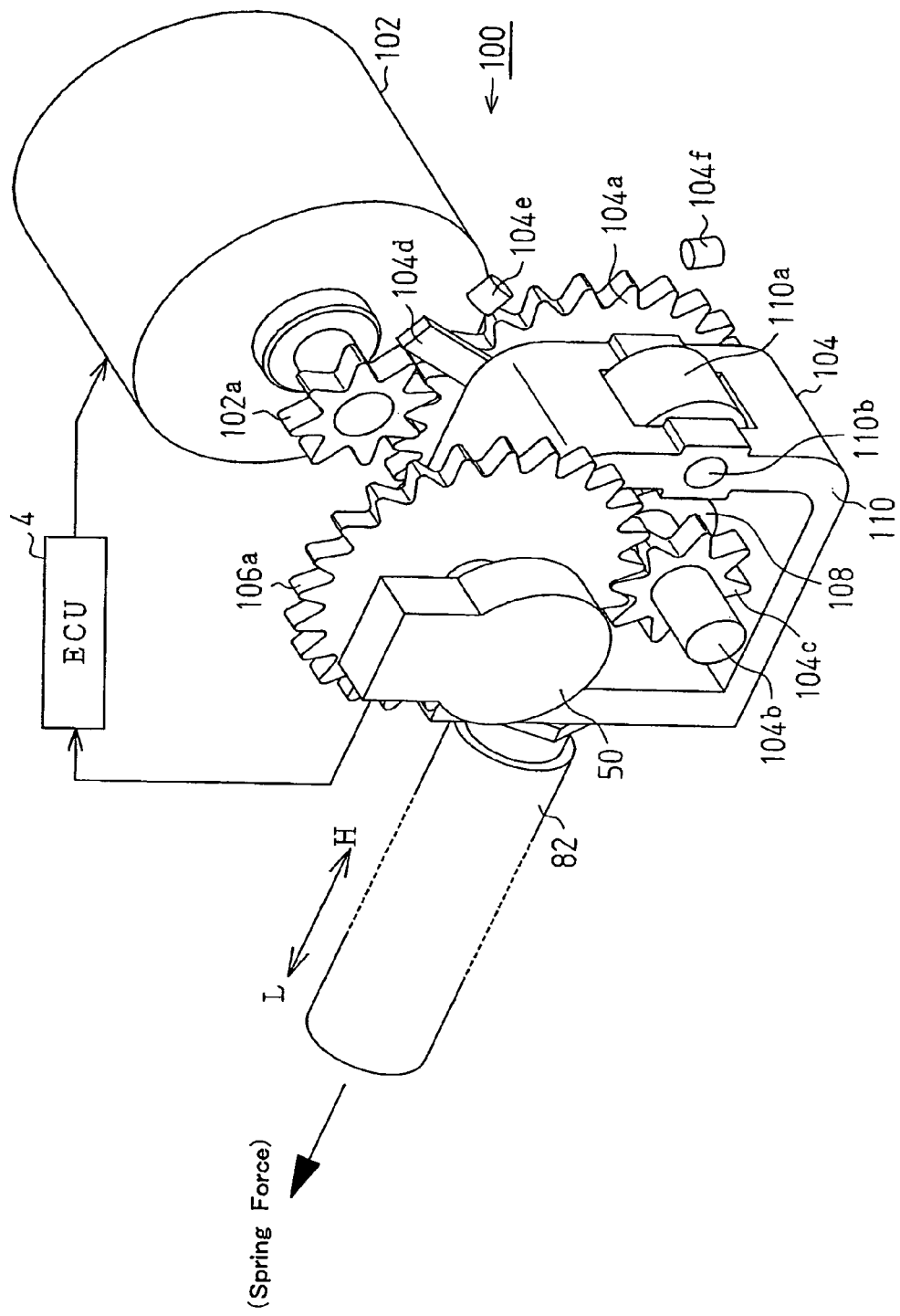

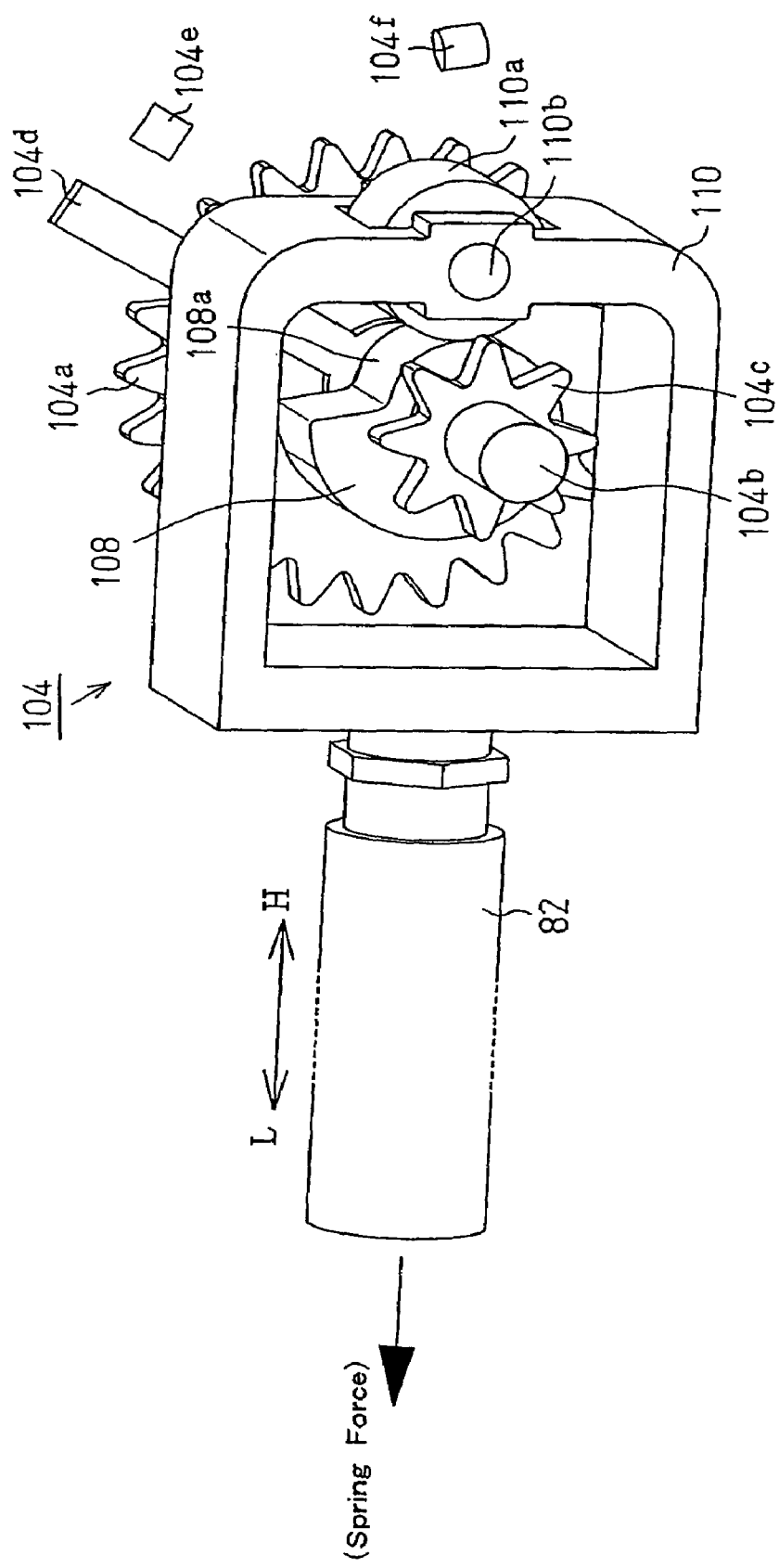

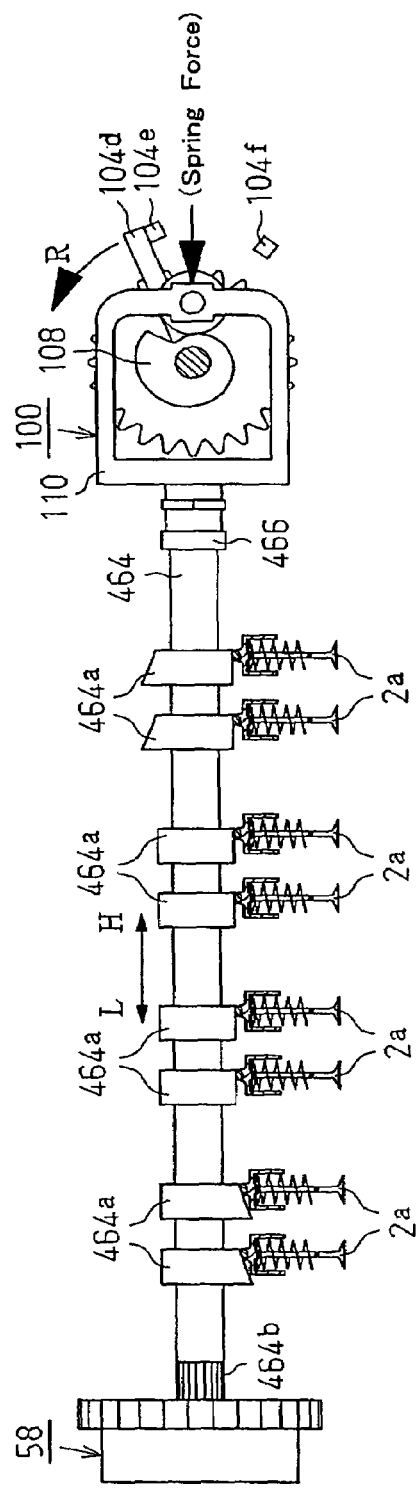
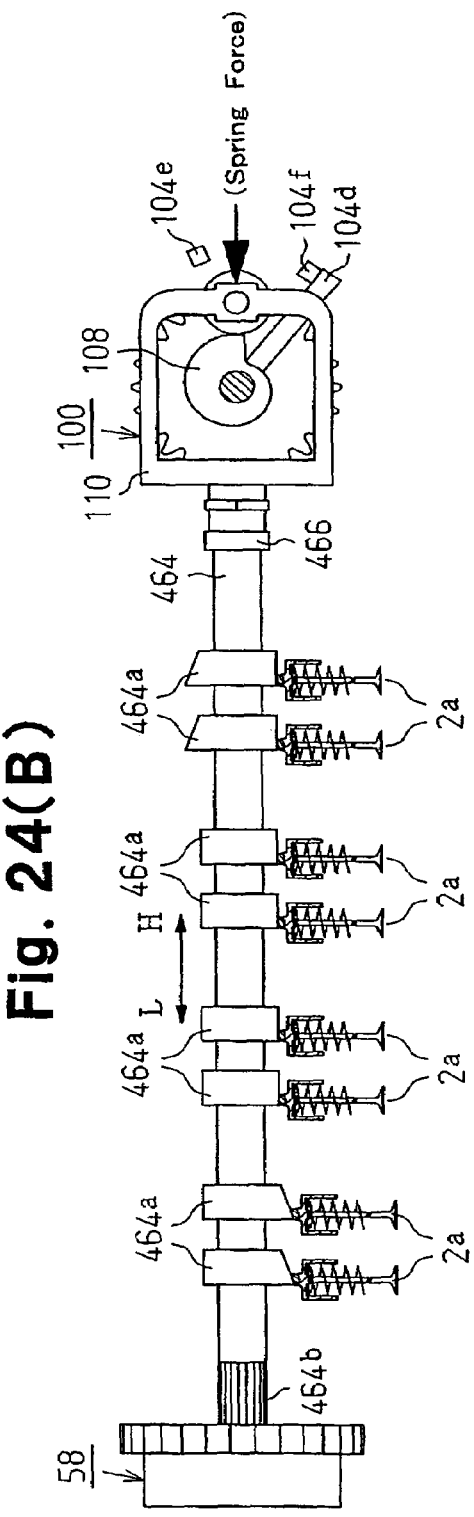

INTAKE AIR AMOUNT CONTROL APPARATUS AND INTAKE AIR AMOUNT CONTROL METHOD FOR INTERNAL COMBUSTION ENGINES

BACKGROUND OF THE INVENTION

This application claims priority to Japanese Patent Application No. 2003-297319 filed 21 Aug. 2003, the content of which is incorporated herein by reference in its entirety.

The present invention relates to intake air amount control apparatuses and methods for internal combustion engines having a variable valve timing system and a valve operating angle variable system.

An internal combustion engine having a variable valve system that varies a valve operating state has been proposed. The valve operating state indicates valve timing, valve lift amount, and valve operating angle of an intake valve or an exhaust valve. Thus, the variable valve system varies the valve operating state by advancing or retarding the valve timing of the intake valve or exhaust valve, as well as varying the valve lift amount and the valve operating angle of the intake valve or exhaust valve.

The valve operating state greatly affects the performance of the engine. Therefore, if adjustment of the valve operating state is hampered by a problem occurring in the variable valve system, the engine must be switched to an engine safety mode immediately, ensuring that the engine operation is maintained as needed.

Japanese National-Phase Laid-Open Patent Publication No. 2002-542421 describes a technique regarding the engine safety mode. In accordance with the technique, if the intake air amount is adjusted by varying the valve operating angle of the intake valve and a problem occurs in the adjustment, the valve operating angle is fixed at a predetermined value. The intake air amount is adjusted by a throttle valve provided in an air intake system.

In accordance with Japanese Laid-Open Patent. Publication No. 2000-130196, if a problem occurs in an engine having a variable valve operating angle system and a variable valve timing system and controlling intake air amount with a throttle valve, valve overlapping is eliminated to ensure stable rotation of the engine. In this manner, the engine may be operated in the engine safety mode.

In an engine having a variable valve operating angle system for an intake valve and a variable valve timing system for an intake valve and/or an exhaust valve, intake air amount may be controlled by the variable valve operating angle system without employing a throttle valve.

In this structure, regardless of a problem caused in the variable valve timing system, the intake air amount may be adjusted through controlling of the valve operating angle of the intake valve, as long as the variable valve operating angle system functions normally. In other words, regardless of the problem hampering the valve timing adjustment, the engine is allowed to be operated in the engine safety mode.

However, it has been found that the engine performance may become unstable in certain cases, even though adjustment of the valve operating angle of the intake valve is maintained or the valve operating angle of the intake valve is fixed and the intake air amount is adjusted by a throttle valve. In this case, it is difficult to operate the engine in the engine safety mode.

This problem cannot be solved if the valve timing is invariable, as in Japanese National-Phase Laid-Open Patent Publication No. 2002-542421.

Further, Japanese Laid-Open Patent Publication No. 2000-130196 does not specify the controlling of the valve operating angle of the intake valve when a problem is detected in the valve timing adjustment. In addition, since the intake air amount is adjusted constantly by the throttle valve in this technique, the aforementioned problem cannot be addressed. It is thus unclear how the variable valve operating angle system for the intake valve is operated when a problem occurs in the valve timing adjustment.

SUMMARY OF THE INVENTION

Accordingly, it is an objective of the present invention to prevent the combustion of an internal combustion engine from becoming unstable and thus enabling the engine to be operated in an engine safety mode.

To achieve the foregoing and other objectives and in accordance with the purpose of the present invention, the invention provides an intake air amount control apparatus for an internal combustion engine having a variable valve system. The variable valve system includes a variable valve timing system and a variable valve operating angle system. The variable valve timing system varies valve timing of at least one of an intake valve and an exhaust valve provided in the engine. The variable valve operating angle system varies a valve operating angle of the intake valve and controls an intake air amount for the engine by adjusting the valve operating angle of the intake valve. The apparatus includes a problem detecting device for detecting a problem of the variable valve timing system, and a controller. When the problem of the variable valve timing system is detected, the controller controls the variable valve operating angle system such that the valve operating angle of the intake valve is restricted to a predetermined safety range for stabilizing combustion of the engine.

The present invention also provides an intake air amount control apparatus for an internal combustion engine having a variable valve system and a throttle valve driving system. The variable valve system includes a variable valve timing system and a variable valve operating angle system. The variable valve timing system varies valve timing of at least one of an intake valve and an exhaust valve provided in the engine. The variable valve operating angle system varies a valve operating angle of the intake valve. The throttle valve driving system adjusts an opening size of a throttle valve disposed in an intake system of the engine. The variable valve operating angle system controls an intake air amount for the engine by adjusting the valve operating angle of the intake valve when the engine is operated normally. The apparatus includes a problem detecting device for detecting a problem of the variable valve timing system, and a controller. When the problem of the variable valve timing system is detected, the controller controls the variable valve operating angle system such that the valve operating angle of the intake valve is fixed to a predetermined safety angle for stabilizing combustion of the engine, and enables the throttle valve driving system to control the intake air amount.

Further, the present invention provides an intake air amount control method for an internal combustion engine having a variable valve system. The variable valve system includes a variable valve timing system and a variable valve operating angle system. The variable valve timing system varies valve timing of at least one of an intake valve and an exhaust valve provided in the engine. The variable valve operating angle system varies a valve operating angle of the intake valve. The method includes: controlling an intake air amount for the engine by adjusting the valve operating angle of the intake valve by means of the variable valve operating angle system; detecting a problem of the variable valve timing system; and controlling the variable valve operating angle system such that the valve operating angle of the intake valve is restricted to a predetermined safety range for stabilizing combustion of the engine, when the problem of the variable valve timing system is detected.

In addition, the present invention provides an intake air amount control method for an internal combustion engine having a variable valve system and a throttle valve driving system. The variable valve system includes a variable valve timing system and a variable valve operating angle system. The variable valve timing system varies valve timing of at least one of an intake valve and an exhaust valve provided in the engine. The variable valve operating angle system varies a valve operating angle of the intake valve. The throttle valve driving system adjusts an opening size of a throttle valve disposed in an intake system of the engine. The method includes: controlling an intake air amount for the engine by adjusting the valve operating angle of the intake valve by means of the variable valve operating angle system, when the engine is operated normally; detecting a problem of the variable valve timing system; controlling the variable valve operating angle system such that the valve operating angle of the intake valve is fixed to a predetermined safety angle for stabilizing combustion of the engine, when the problem of the variable valve timing system is detected; and enabling the throttle valve driving system to control the intake air amount, when the problem of the variable valve timing system is detected.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 6(A) and 6(B) are views explaining the operation of the mediating drive mechanism of FIG. 3;

FIGS. 7(A) and 7(B) are views explaining the operation of the mediating drive mechanism of FIG. 3;

FIG. 9 is a perspective view showing a shaft sliding mechanism of the valve system of FIG. 2;

FIG. 10 is a perspective view showing a spiral cam mechanism in the shaft sliding mechanism of FIG. 9;

FIGS. 24(A) and 24(B) are views explaining the operation of the valve system of FIG. 23.

DETAILED DESCRIPTION OF THE PREFERRED EMBODIMENTS

Figure 1:
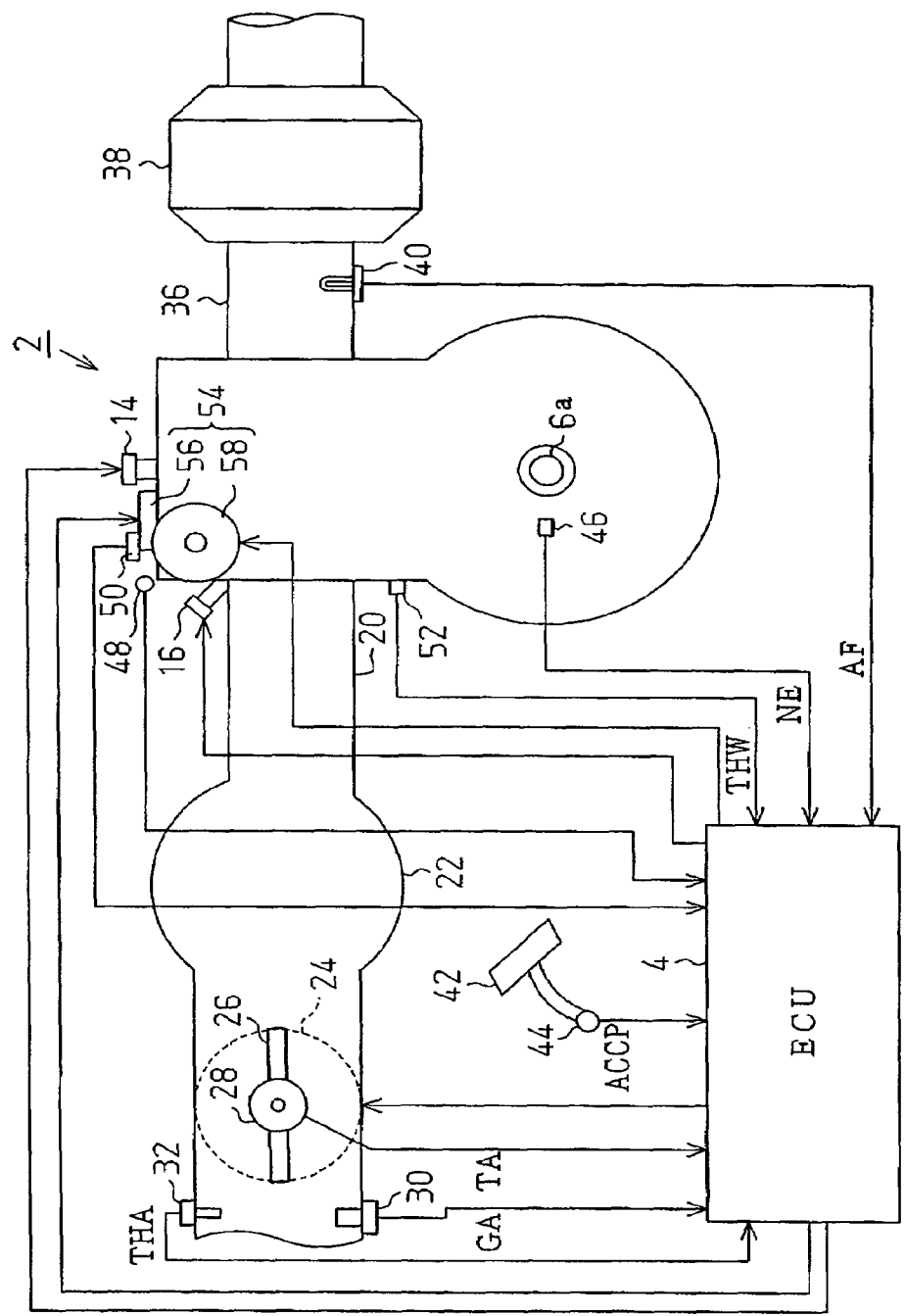
FIG. 1 is a schematic view showing the structure of an engine and ECU according to a first embodiment of the present invention.
Figure 2:
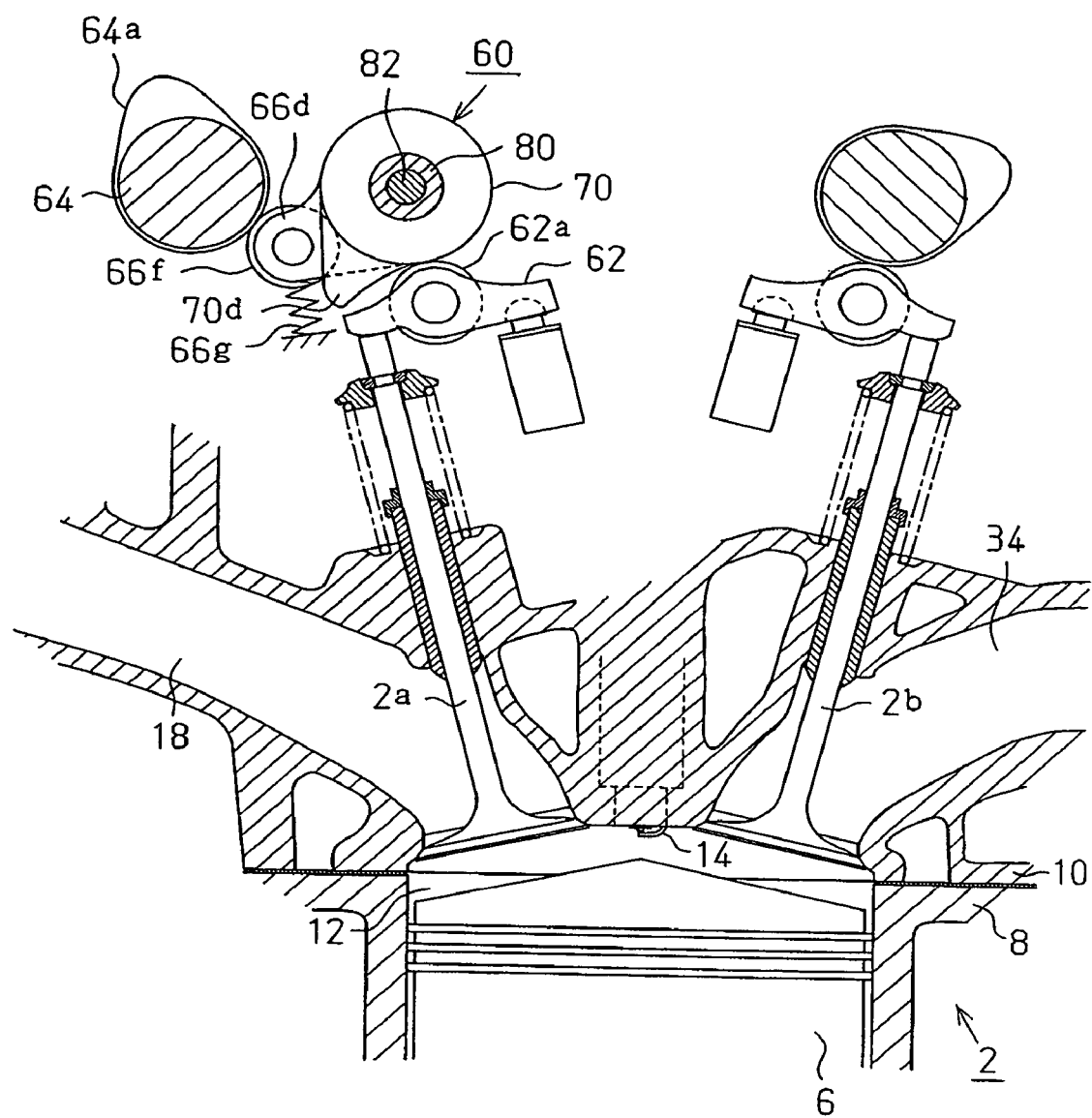
FIG. 2 is a longitudinal cross-sectional view showing a valve system provided in the engine of FIG. 1.

A first embodiment of the present invention will hereafter be described. FIG. 1 schematically illustrates a gasoline engine 2, or an engine, and an electronic control unit (hereinafter, referred to as "ECU") 4, serving as a control device. The engine 2 has a plurality of cylinders, or, in this embodiment, four cylinders. A valve system for one of the cylinders is shown in FIG. 2. Each of the cylinders includes a pair of intake valves 2a and a pair of exhaust valves 2b. The engine 2 is thus a four valve type. However, the engine 2 may include six or eight cylinders and may be a two valve type or a five valve type engine.

The power of the engine 2 is transmitted to the wheels through a transmission as drive force. The engine 2 has a combustion chamber 12 defined by a piston 6, a cylinder block 8, and a cylinder head 10. The cylinder head 10 includes an ignition plug 14 for igniting fuel-air mixture in the combustion chamber 12 and a fuel injecting valve 16 for injecting fuel directly into the combustion chamber 12. The fuel injecting valve 16 may inject fuel to an intake port 18 connected to the combustion chamber 12.

The intake port 18 is opened or closed selectively by the corresponding intake valve 2a. Intake passages 20 connected to the intake port 18 are connected to a surge tank 22. A throttle valve 26 is provided at an upstream position with respect to the surge tank 22. The opening size of the throttle valve 26 is adjusted by a motor 24. Normally, the throttle valve 26 is maintained in a substantially fully open state. However, depending on the state of the engine 2, or when the valve operating angle is fixed as will be described later, the opening of the throttle valve 26 (the throttle opening size TA) may be controlled for adjusting intake air amount GA. The throttle opening size TA is detected by a throttle opening size sensor 28 and is read by the ECU 4. The intake air amount GA is detected by an intake air amount sensor 30, which is provided at an upstream position with respect to the throttle valve 26. Further, intake air temperature THA is detected by an intake air temperature sensor 32, which is provided also at an upstream position with respect to the throttle valve 26, and is read by the ECU 4.

An exhaust port 34 connected to the combustion chamber 12 is opened or closed selectively by the exhaust valves 2*b*. In an exhaust passage 36 connected to the exhaust port 34, an exhaust purifying catalyst converter 38 is deployed. An air-fuel ratio sensor 40 is disposed at an upstream position of the exhaust passage 36 with respect to the exhaust purifying catalyst converter 38. The air-fuel ratio sensor 40 detects air-fuel ratio AF based on an exhaust element contained in the exhaust passage 36. The ECU 4 reads the detected value.

The ECU 4 is an engine control circuit including a digital computer as a main component. The ECU 4 receives signals from sensors detecting the operating state of the engine 2, other than the throttle opening size sensor 28, the intake air amount sensor 30, the intake air temperature sensor 32, and the air-fuel ratio sensor 40. More specifically, the ECU 4 receives signals from a pedal depressing amount sensor 44, an engine speed sensor 46, and a reference crank angle sensor 48. The pedal depressing amount sensor 44 detects the depressing amount of an accelerator pedal 42 (pedal depressing amount ACCP). The engine speed sensor 46 detects engine speed NE in correspondence with rotation of a crankshaft 6*a*. The reference crank angle sensor 48 determines a reference crank angle in correspondence with rotation of an intake camshaft. Further, a rotating angle sensor 50 for detecting a valve operating angle, which will be described later, and a coolant temperature sensor 52 for detecting engine coolant temperature THW also send signals to the ECU 4. In addition, other than the aforementioned sensors, various sensors for detecting other data are deployed.

In accordance with the detection results of the aforementioned sensors, the ECU 4 controls the fuel injecting timing, fuel injecting amount, throttle opening size TA, and igniting timing of the engine 2, using control signals directed to the fuel injecting valve 16, the throttle valve motor 24, or the ignition plug 14. Also, in correspondence with the pedal depressing amount ACCP and engine speed NE, the ECU 4 adjusts the valve operating angle and valve timing of each of the intake valves 2*a* using a control signal directed to a variable valve mechanism 54. The variable valve mechanism 54 adjusts the valve operating angle and valve timing of each intake valve 2*a*. More specifically, when the engine 2 is operated normally, the intake air amount is adjusted by means of the valve operating angle of each intake valve 2*a*.

The variable valve mechanism 54 is configured by a valve operating angle adjusting mechanism 56 and a valve timing adjusting mechanism (hereinafter referred to as "VVT") 58. The valve operating angle adjusting mechanism 56 includes a mediating drive mechanism 60, which is illustrated in FIGS. 2 to 5, and a shaft sliding mechanism 100, which is illustrated in FIGS. 9 and 10.

As illustrated in FIG. 2, the mediating drive mechanism 60 is disposed between a roller locker arm 62 provided for each of the intake valves 2*a* and an intake cam 64*a* formed in an intake camshaft 64. The mediating drive mechanism 60 thus mediates between the intake cam 64*a* and the roller locker arm 62 for applying valve driving force from the intake cam 64*a* to the roller locker arm 62, such that the corresponding intake valve 2*a* is operated.

Figure 3:
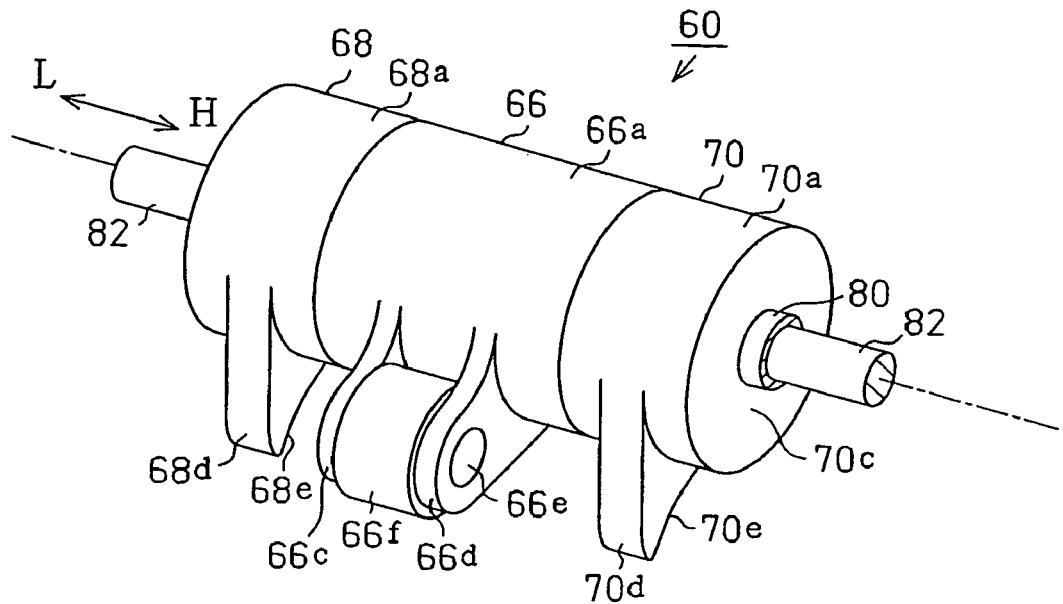
FIG. 3 is a perspective view showing a mediating drive mechanism in the valve system of FIG. 2.
Figure 4:
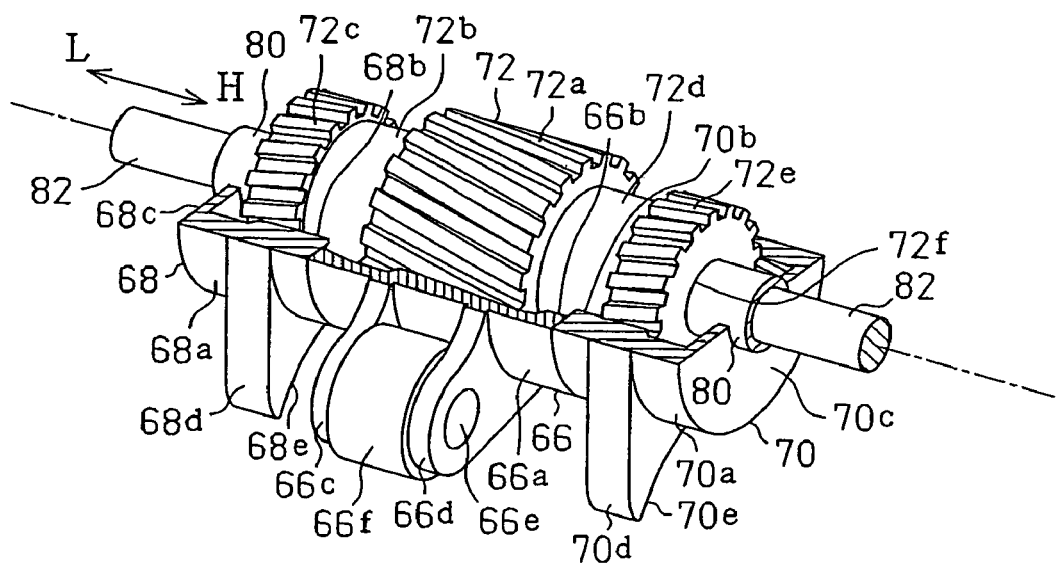
FIG. 4 is a broken perspective view showing the mediating drive mechanism of FIG. 3.
Figure 5:
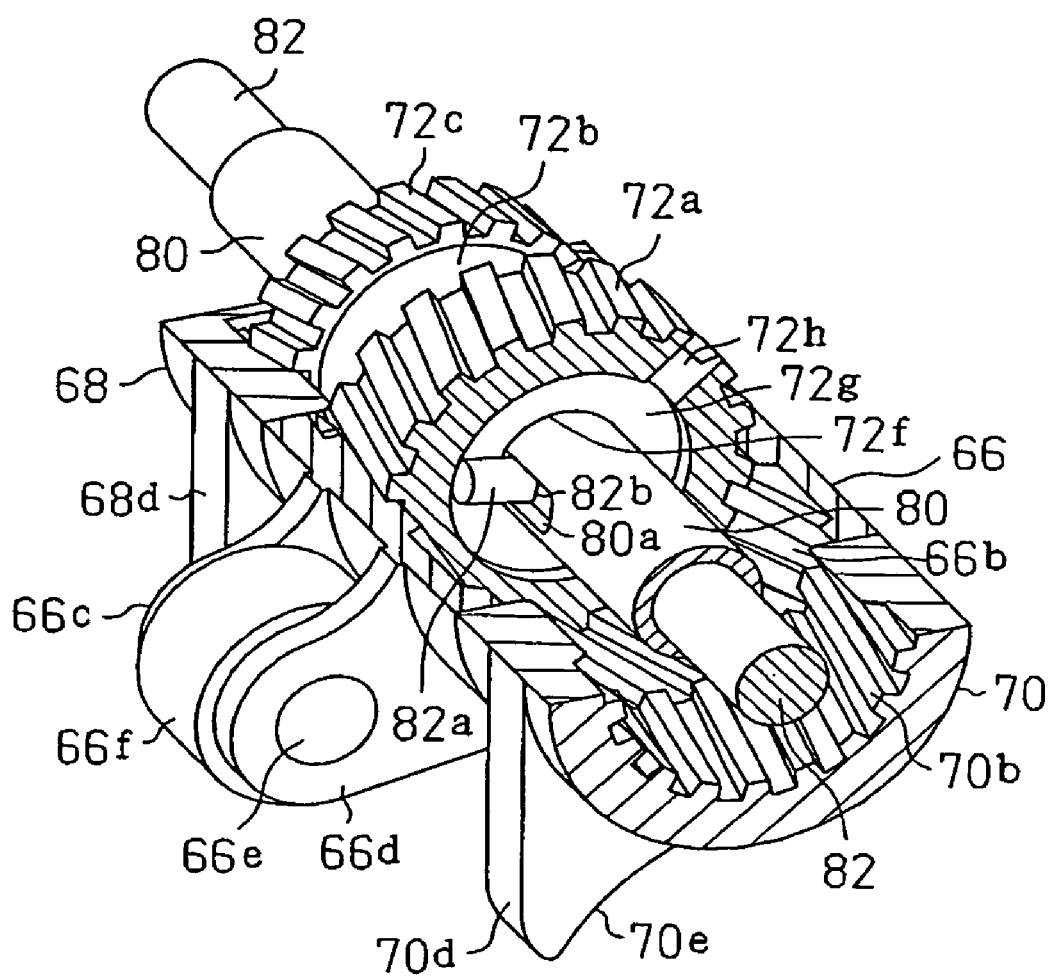
FIG. 5 is another broken perspective view showing the mediating drive mechanism of FIG. 3.

With reference to the perspective view of FIG. 3 and the horizontally broken perspective view of FIG. 4, the mediating drive mechanism 60, which is provided in each of the cylinders, includes an input portion 66, a first oscillating cam 68, a second oscillating cam 70, and a slider gear 72. The input portion 66 is located at the middle of the mediating mechanism 60. The first oscillating cam 68 is formed at one side of the input portion 66, and the second oscillating cam 70 is formed at the opposing side. The slider gear 72 is received in the interior of the mediating drive mechanism 60.

Space is defined axially in a housing 66*a* for the input portion 66. A helical spline 66*b* is formed axially along the inner peripheral surface of the housing 66*a*, in a helical manner like a right-hand thread. A pair of parallel arms 66*c*, 66*d* project from the outer peripheral surface of the housing 66*a*. A roller 66*f* is rotationally supported by distal portions of the arms 66*c*, 66*d*. The roller 66*f* includes a shaft 66*e* extending parallel with the axis of the housing 66*a*. Further, as is shown in FIG. 2, urging force of a spring 66*g* is applied to the arms 66*c*, 66*d* or the housing 66*a*, such that the roller 66*f* is held constantly in contact with the corresponding intake cam 64*a*.

Also, space is defined axially in a housing 68*a* for the first oscillating cam 68. A helical spline 68*b* is formed axially along the inner peripheral surface of the housing 68*a*, in a helical manner like a left-hand thread. One end of the space defined by the housing 68*a* is closed by an annular bearing portion 68*c* having a central hole with a relatively small diameter. Further, a substantially triangular nose 68*d* projects from the outer peripheral surface of the housing 68*a*. One side of the nose 68*d* forms a cam surface 68*e* curved in a recessed manner.

Likewise, space is defined axially in a housing 70*a* for the second oscillating cam 70. A helical spline 70*b* is formed axially along the inner peripheral surface of the housing 70*a*, in a helical manner like a left-hand thread. One end of the space defined by the housing 70*a* is closed by an annular bearing portion 70*c* having a central hole with a relatively small diameter. Further, a substantially triangular nose 70*d* projects from the outer peripheral surface of the housing 70*a*. One side of the nose 70*d* forms a cam surface 70*e* curved in a recessed manner.

The first and second oscillating cams 68, 70 are placed with the bearing portions 68*c*, 70*c* facing outwards, such that the corresponding end surfaces of the oscillating cams 68, 70 are held in contact with the opposing ends of the input portion 66 and the cams 68, 70 extend coaxially. As a whole, with reference to FIG. 3, the input portion 66 and the first and second oscillating cams 68, 70 form a hollow, substantially cylindrical shape.

A slider gear 72 is received in the space defined by the input portion 66 and the first and second oscillating cams 68, 70. The slider gear 72 has a substantially columnar shape. An input helical spline 72*a* is formed along an intermediate section of the outer peripheral surface of the slider gear 72 in a helical manner like a right hand thread. A first output helical spline 72*c* is formed in a helical shape like a left hand thread, at one side of the input helical spline 72*a* with a small diameter portion 72*b* located between the first output helical spline 72*c* and the input helical spline 72*a*. A second output helical spline 72*e* is formed in a helical shape like a left hand thread, at the side of the input helical spline 72*a* opposed to the first output helical spline 72*c*, with a small diameter portion 72*d* located between the second output helical spline 72*e* and the input helical spline 72*a*. The outer diameters of the first and second output helical splines 72c, 72e are smaller than that of the input helical spline 72a.

A through hole 72f extends axially through the slider gear 72. As illustrated in the longitudinal cross-sectional view of FIG. 5, a circumferential groove 72g is defined circumferentially in the wall of the through hole 72f at a position corresponding to the input helical spline 72a. The cylindrical groove 72g has a pin inserting hole 72h, which radially extends through the wall of the cylindrical groove 72g to the exterior.

A support pipe 80 is accommodated in the through hole 72f of the slider gear 72, such that the support pipe 80 is allowed to slide circumferentially. The support pipe 80 is provided in the single number commonly for the mediating drive mechanisms 60 of all cylinders. A plurality of axially elongated holes 80a are defined in the support pipe 80 at positions corresponding to the mediating drive mechanisms 60.

A control shaft 82 extends through the support pipe 80 such that the control shaft 82 is allowed to slide axially. A plurality of support holes 82b are defined in the control shaft 82 at the positions corresponding to the elongated holes 80a of the support pipe 80. Each of the support holes 82b extends perpendicular to the axis. Each support hole 82b receives a proximal portion of a control pin 82a, such that the control pin 82a is supported as projecting in a direction perpendicular to the axis.

When the control shaft 82 is received in the support pipe 80, the distal end of each of the control pins 82a extends through the corresponding elongated hole 80a of the support pipe 80 and is received in the circumferential groove 72g, which is defined in the inner peripheral surface of the slider gear 72.

In this structure, the slider gears 72 are moved axially by the movement of the control shaft 82. The axial position of the slider gear 72 in each of the mediating drive mechanisms 60 is thus determined by controlling the position of the control shaft 82. The control pins 82a in the circumferential groove 72g do not restrict the rotation of the slider gear 72.

In each of the slider gears 72, the input helical spline 72a is meshed with the helical spline 66b, which is formed in the inner peripheral surface of the input portion 66. Further, the first output helical spline 72c is meshed with the helical spline 68b, which is formed in the inner peripheral surface of the first oscillating cam 68. The second output helical spline 72e is meshed with the helical spline 70b, which is formed in the inner peripheral surface of the second oscillating cam 70.

Each of the mediating drive mechanisms 60 is attached to an upper portion of the corresponding cylinder head 10 by means of the bearing portions 68c, 70c, such that the mediating drive mechanism 60 is stopped from axially moving. Therefore, even if the control shaft 82 axially moves the slider gear 72, the input portion 66 and the oscillating cams 68, 70 do not move axially.

Accordingly, by adjusting the axial movement amount of the slider gear 72 in each mediating drive mechanism 60, the phase difference between the input portion 66 and each of the oscillating cams 68, 70 is changed due to the functions of the helical splines 72a, 66b, 72c, 68b, 72e, and 70b. This changes the position of the roller 66f relative to the positions of the noses 68d, 70d.

FIGS. 6(A) and 6(B) show the operating state of each mediating drive mechanism 60 when the control shaft 82 is moved by a maximum amount in direction L (as indicated by the arrows of FIG. 3, 4). FIG. 6(A) indicates a closed valve state, and FIG. 6(B) indicates an open valve state. In these states, the roller 66f of the input portion 66 is located at the closest position relative to the positions of the noses 68d, 70d of the oscillating cams 68, 70. Therefore, as illustrated in FIG. 6(B), even if the intake cam 64a lowers the roller 66f by a maximum amount, the lowering amount of the locker roller 62a by the cam surfaces 68e, 70e of the noses 68d, 70d becomes minimum. The valve operating angle and valve lift amount of the corresponding intake valve 2a thus become minimum. Accordingly, the amount of the intake air supplied from the intake port 18 to the combustion chamber 12 also becomes minimum.

FIGS. 7(A) and 7(B) show the operating state of each mediating drive mechanism 60 when the control shaft 82 is moved by a maximum amount in direction H (as indicated by the arrows of FIG. 3, 4). FIG. 7(A) indicates a closed valve state, and FIG. 7(B) indicates an open valve state. In these states, the roller 66f of the input portion 66 is located at the position most separate relative to the positions of the noses 68d, 70d of the oscillating cams 68, 70. Therefore, as illustrated in FIG. 7(B), if the intake cam 64a lowers the roller 66f by the maximum amount, the lowering amount of the locker roller 62a by the cam surfaces 68e, 70e of the noses 68d, 70d becomes maximum. The valve operating angle and valve lift amount of the corresponding intake valve 2a thus become maximum. Accordingly, the amount of the intake air supplied from the intake port 18 to the combustion chamber 12 also becomes maximum.

Figure 8:
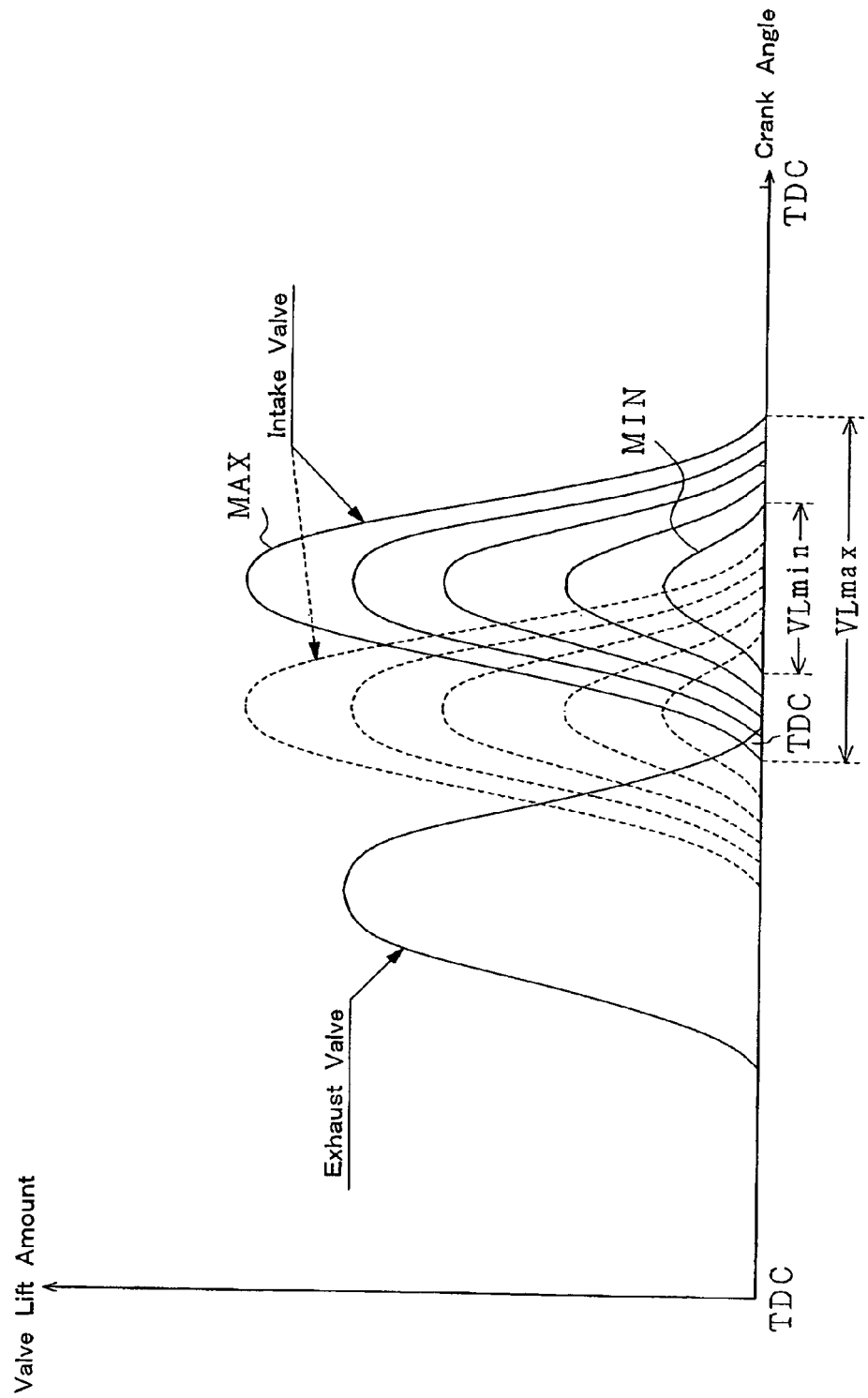
FIG. 8 is a graph indicating variation of valve operating angle and valve timing of the valve system of FIG. 2.

In this manner, by adjusting the axial position of the control shaft 82, the valve operating angle and valve lift amount of each of the intake valves 2a may be adjusted in a continuous manner between the states of FIG. 6 and the states of FIG. 7, as indicated by the solid lines in FIG. 8. In FIG. 8, line MIN represents the states of FIG. 6, and line MAX represents the states of FIG. 7. Therefore, it is possible to adjust the intake air amount without depending on the throttle valve 26. Further, in FIG. 8, the solid lines represent the cases in which the valve timing corresponds to the most retarded angle, and the broken lines indicate the cases in which the valve timing corresponds to the most advances angle. The valve timing is adjusted by the VVT 58 in a continuous manner between the most retarded angle and the most advanced angle.

FIG. 9 illustrates the shaft sliding mechanism 100 axially moving the control shaft 82. The shaft sliding mechanism 100 includes a drive motor 102, a spiral cam mechanism 104, and a rotating angle sensor 50.

The drive motor 102 is secured to the cylinder head 10 and rotates a small diameter gear 102a when receiving a drive signal from the ECU 4. The small diameter gear 102a rotates a large diameter gear 104a of the spiral cam mechanism 104. This changes the rotation phase of a spiral cam 108 in the interior of the spiral cam mechanism 104 through a camshaft 104b. The camshaft 104b is rotationally supported by the cylinder head 10 and includes a small diameter gear 104c. Through the small diameter gear 104c, the camshaft 104b rotates a large diameter gear 106a, which is disposed at a side of the rotating angle sensor 50 and is secured to the cylinder head 10. This rotates a rotor in the rotating sensor 50, formed by a resolver or the like, such that the rotation phase of the spiral cam 108 is detected by the rotating angle sensor 50. The detected rotating angle is read by the ECU 4. When a stopper arm 104d attached to the camshaft 104 contacts a pair of stoppers 104e, 104f, which are adjustably secured to an external component (in this embodiment, the cylinder head 10), the rotation of the spiral cam 108 is restricted to a range smaller than 360 degrees, or, in this embodiment, a range of 300 degrees.

The perspective view of FIG. 10 shows the configuration of the spiral cam mechanism 104. The spiral cam mechanism 104 is provided with a cam frame 110, in addition to the large diameter gear 104a, the camshaft 104b, the small diameter gear 104c, the stopper arm 104d, the stoppers 104e, 104f and the spiral cam 108. The spiral cam 108 is accommodated in the space defined by the cam frame 110. A roller 110a with a circular cross-sectional shape is rotationally supported by the cam frame 110 through a shaft 110b parallel with the camshaft 104b. The roller 110a contacts a spiral cam surface 108a of the spiral cam 108. One end of the control shaft 82 is secured to the side of the cam frame 110 opposed to the side corresponding to the roller 110a. Thus, if the cam frame 110 moves in the axial direction of the control shaft 82, the control shaft 82 follows the movement such that the axial position of the control shaft 82 is changed. In order to constantly maintain the roller 110a in contact with the spiral cam surface 108a of the spiral cam 108, urging force is applied to the cam frame 110, or the control shaft 82, in the direction indicated by the large arrow in FIG. 10.

Figure 11A:
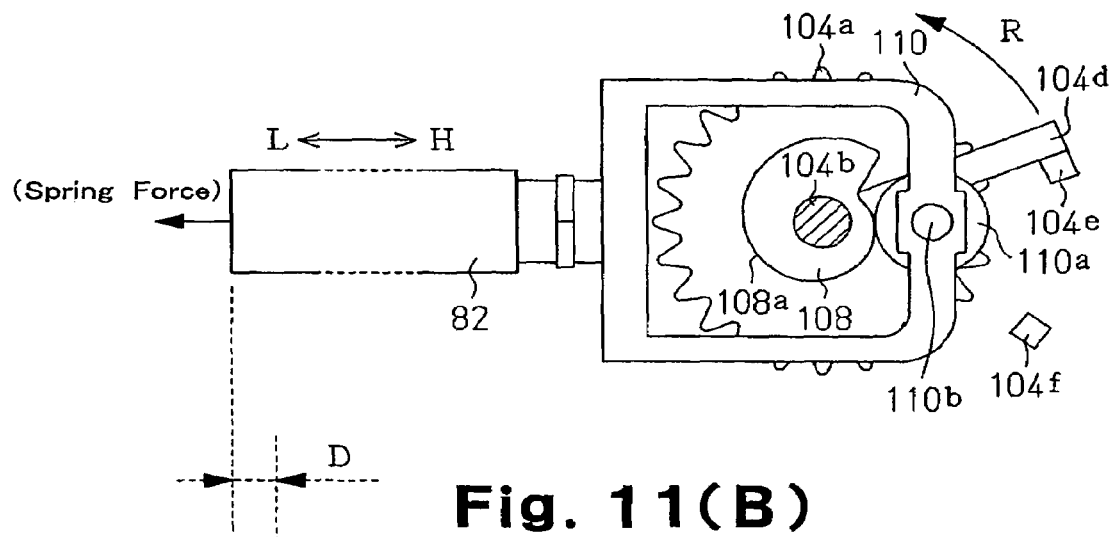
FIG. 11 is a view explaining the operation of the spiral cam mechanism of FIG. 10.

The cam frame 110 is moved in the following manner. More specifically, as illustrated in FIG. 11(A), the drive motor 102 (FIG. 9) is rotated such that the stopper arm 104d contacts a minimum operating angle stopper 104e. This places the roller 110a in contact with a portion of the spiral cam surface 108a of the spiral cam 108 closest to the camshaft 104b. Meanwhile, the cam frame 110 is moved by the maximum amount in direction L. Following the cam frame 110, the control shaft 82 is also moved by the maximum amount in direction L due to the urging force. Accordingly, the states in FIG. 6, in which the valve operating angle and valve lift amount are minimum, are brought about.

If the drive motor 102 is rotated such that the stopper arm 104d is pivoted in direction R, as illustrated in FIG. 11(A), the stopper arm 104d is separated from the minimum operating angle stopper 104e. This enables the spiral cam surface 108a of the spiral cam 108 to move the roller 110a in direction H. The cam frame 110 as a whole thus moves in direction H. Following the cam frame 110, the control shaft 82 also moves in direction H against the urging force. This increases the valve operating angle and valve lift amount.

Figure 11B:
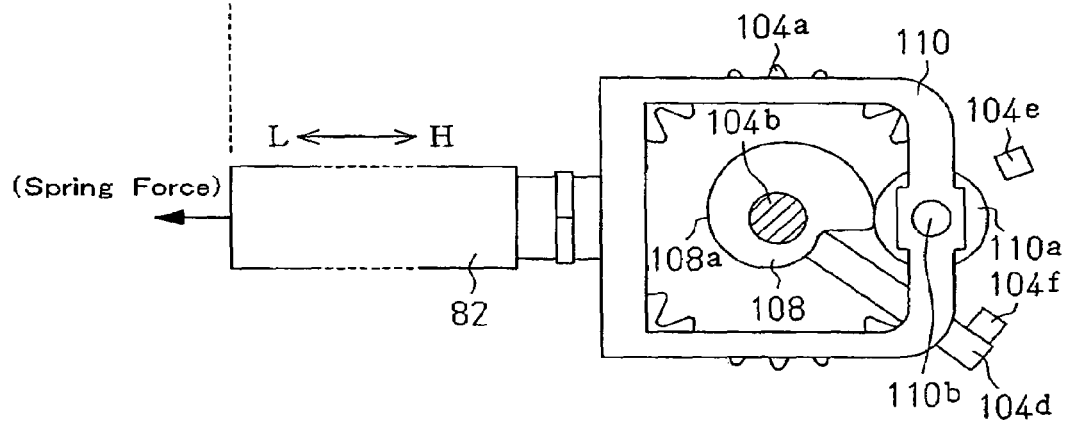

When the stopper arm 104d is pivoted at 300 degrees, as shown in FIG. 11(B), the stopper arm 104d comes in contact with a maximum operating angle stopper 104f. This places the roller 11a in contact with a portion of the spiral cam surface 108a of the spiral cam 108 most spaced from the camshaft 104b. Meanwhile, the cam frame 110 is moved by the maximum amount in direction H. Following the cam frame 110, the control shaft 82 is also moved by the maximum amount in direction H against the urging force. Accordingly, the states in FIG. 7, in which the valve operating angle and valve lift amount are maximum, are brought about.

Figure 12:
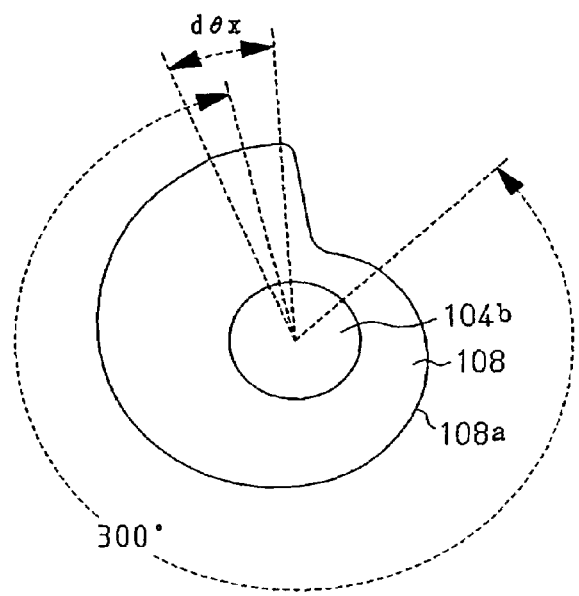
FIG. 12 is a view explaining the shape of a spiral cam of the spiral cam mechanism of FIG. 10.

With reference to FIG. 12, the spiral cam surface 108a of the spiral cam 108 includes a constant operating angle zone. The zone corresponds to a distance $d\theta x$ defined at the portion of the spiral cam surface 108a most spaced from the camshaft 104b, in which the valve operating angle and valve lift amount become maximum. In the constant operating angle zone, the distance between the spiral cam surface 108a and the camshaft 104b remains constant, regardless of the rotating angle of the spiral cam 108. Accordingly, in correspondence with this zone, the valve operating angle and valve lift amount of the intake valve 2a are maintained at known, maximum values, regardless of the rotation phase of the spiral cam 108.

Figure 13:
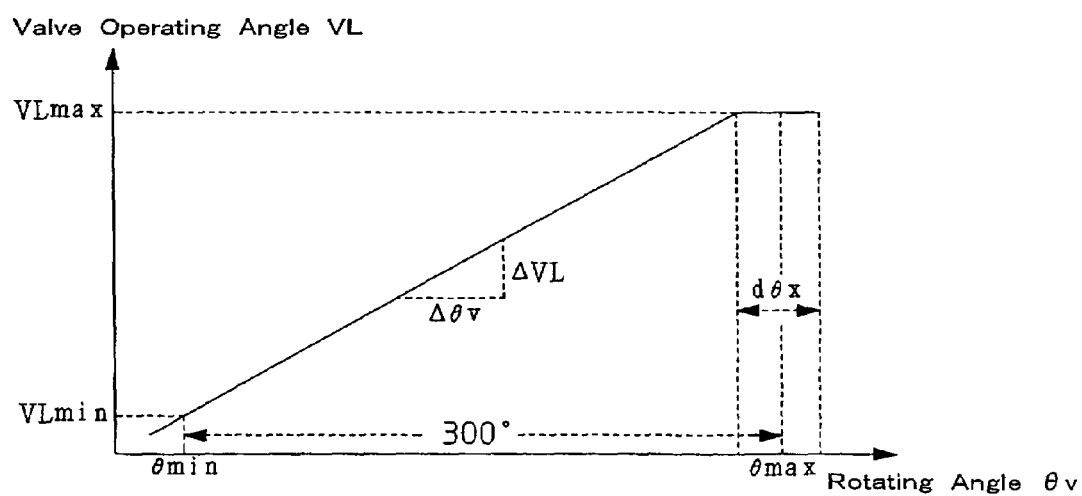
FIG. 13 is a graph indicating the relationship between rotating angle θv and valve operating angle VL of the spiral cam of FIG. 12.

FIG. 13 indicates the relationship between the rotating angle $\theta v$ of the spiral cam 108 and the valve operating angle VL.

Figure 14:
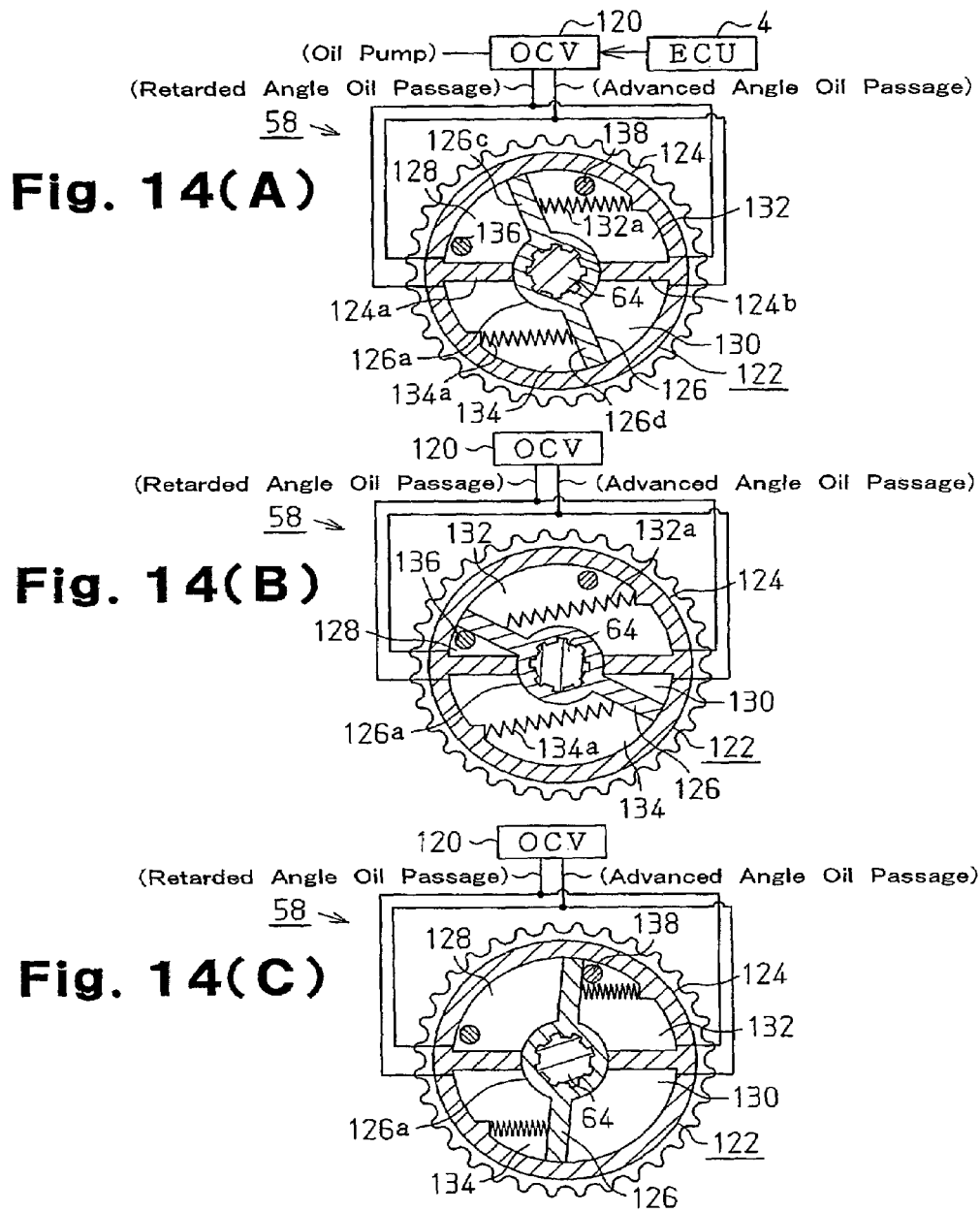
FIGS. 14(A) to 14(C) are views explaining the configuration and operation of a valve timing adjusting mechanism for the valve system of FIG. 2.

Next, the VVT 58 will be explained. The VVT 58, as illustrated in the longitudinal cross-sectional views of FIGS. 14(A) to 14(C), is configured by an oil control valve (hereinafter referred to as "OCV") 120 and a vane type hydraulic rotating mechanism 122. In response to an instruction from the ECU 4, the OCV 120 is operated selectively in a mode of supplying hydraulic fluid from an oil pump to an advanced angle fluid passage, a mode of supplying the hydraulic fluid to a retarded angle fluid passage., or a mode of blocking communication between the oil pump and the both angle fluid passages.

The vane type hydraulic rotating mechanism 122, as illustrated in FIG. 14(A), includes a short-cylindrical casing 124 formed integrally with a timing sprocket. A vane body 126 is located at the middle of the casing 124. An end of the intake camshaft 64 is passed through and engaged with a shaft 126a, or the middle portion of the vane body 126, in an engaged state. This enables the intake camshaft 64 to rotate together with the vane body 126.

A pair of wall sections 124a, 124b project from two axisymmetric positions of the casing 124. The distal ends of the wall sections 124a, 124b contact the shaft 126a in an oil tight manner. Likewise, a pair of vanes 126c, 126d project from the shaft 126a of the vane body 126, contacting the inner wall of the casing 124 in an oil tight manner.

In this manner, the interior of the casing 124 is divided into four chambers. More specifically, a pair of fluid chambers 128, 130 are connected to the advanced angle fluid passage. A pair of fluid chambers 132, 134, which respectively accommodate compressed springs 132a, 134a, are connected to the retarded angle fluid passage. The fluid chambers 128, 132 respectively receive stoppers 136, 138 for restricting the rotating range of the vane body 126.

FIG. 14(B) illustrates the state in which hydraulic fluid is discharged from the vane type hydraulic rotating mechanism 122 to the advanced angle fluid passage and is supplied from the retarded angle fluid passage to the vane type hydraulic rotating mechanism 122. The fluid chambers 132, 134 are thus enlarged, while the fluid chambers 128, 130 are reduced. The vane body 126 is thus rotated leftward relative to the casing 124 and contacts the stopper 136. In this state, the relative rotation of the intake camshaft 64 switches the valve timing of the corresponding intake valve 2a to the most retarded angle state, as indicated by the solid lines in FIG. 8.

When the hydraulic fluid supply is stopped, or, for example, the engine 2 is stopped, the springs 132a, 134a urge the vane type hydraulic rotating mechanism 122 to be maintained in the state of FIG. 14(B).

FIG. 14(C) illustrates the state in which hydraulic fluid is discharged from the vane type hydraulic rotating mechanism 122 to the retarded angle fluid passage and is supplied from the advanced angle fluid passage to the vane type hydraulic rotating mechanism 122. The fluid chambers 128, 130 are thus enlarged, while the fluid chambers 132, 134 are reduced. The vane body 126 is thus rotated rightward relative to the casing 124 and contacts the stopper 138. In this state, the relative rotation of the intake camshaft 64 switches the valve timing of the corresponding intake valve 2a to the most advanced angle state, as indicated by the broken lines in FIG. 8.

FIG. 14(A) indicates the state intermediate between the states of FIGS. 14(B) and 14(C). In this state, the valve timing of each intake valve 2a is held at an intermediate state. This state corresponds to a state intermediate between the state indicated by the solid lines and the state indicated by the broken lines.

Next, a valve operating angle control procedure executed by the ECU 4 will be explained with reference to FIG. 15, which is a flowchart indicating the procedure, or an intake air amount control procedure. The procedure is executed by the ECU 4 repeatedly at constant time intervals.

First, the ECU 4 reads actual valve operating angle VLa in step S102. The actual valve operating angle VLa corresponds to a value representing the valve operating angle of each intake valve 2a computed by the ECU 4 in a separate procedure, based on a detected value θv of the rotating angle sensor 50. More specifically, the ECU 4 first obtains the valve operating angle VL based on the detected value θv with reference to the map of FIG. 13. The valve operating angle VL is then compensated with a learned value reflecting a detecting error. The compensated value corresponds to the actual valve operating angle VLa.

Subsequently, the ECU 4 reads actual valve timing VTa in step S104. The actual valve timing VTa corresponds to a value representing the valve timing of each intake valve 2a, computed by the ECU 4 in a separate procedure, based on the crank angle difference between an output pulse of the engine speed sensor 46 and an output pulse of the reference crank angle sensor 48. The value is indicated as advanced angle value. More specifically, the ECU 4 compensates a detected value representing the valve timing VT with a learned value, thus determining the actual valve timing VTa.

In the subsequent step S106, the ECU 4 determines whether or not the VVT 58 has a problem. Regarding the determination, the ECU 4 executes a separate, problem detecting procedure. More specifically, the ECU 4 operates the VVT 58 to control the valve timing by adjusting the actual valve timing VTa to target valve timing VTt. The target valve timing VTt is determined in correspondence with the engine operating state (including the actual valve operating angle VLa and the engine speed NE). By controlling the valve timing, the ECU 4 adjusts the air intake efficiency, as well as the internal EGR rate. The "internal EGR" indicates recirculation of burned gas produced in each of the cylinder during a combustion stroke to the cylinder in an intake stroke, due to overlapping between the intake valves 2a and the exhaust valves 2b. The internal EGR rate indicates the proportion of the recirculated burned gas in each cylinder with respect to the fresh air introduced into the cylinder.

If the actual valve timing VTa responds to the controlling only after significant delay or dose not respond at all, the ECU 4 determines that the VVT 58 has a problem. If this is the case, the ECU 4 operates the VVT 58 by means of the OCV 120 such that the valve timing becomes the most retarded angle valve timing VTmin. Hereafter, this operation is referred to as "a VVT safety operation". In other words, regardless of the problem, the valve timing is retarded to the most retarded angle valve timing VTmin, as long as the VVT 58 is capable of retarding the valve timing.

If it is determined that the VVT 58 does not have a problem in accordance with the problem detecting procedure ("NO" in step S106), the ECU 4 computes target valve operating angle VLt in correspondence with a required load rate in step S108. More specifically, a load rate is obtained with reference to a map predetermined by a test based on the pedal depressing amount ACCP and the engine speed NE. The obtained load rate is defined as the required load rate. The target valve operating angle VLt is determined in accordance with the required load rate, with reference to a map or using an equation. The load rate indicates the rate of the engine load with respect to the maximum engine load.

Subsequently, in step S120, the ECU 4 drives the motor 102 such that the actual valve operating angle VLa becomes the target valve operating angle VLt. That is, the motor 102 is driven in correspondence with the rotating direction and rotating angle computed based on the difference between the actual valve operating angle VLa and the target valve operating angle VLt. The current procedure is thus completed.

As has been described, as long as the VVT 58 does not have a problem, the intake air amount for each combustion chamber 12 is controlled by the valve operating angle adjusting mechanism 56, which is included in the variable valve mechanism 54. Adjustment of auxiliary factors including air intake efficiency is performed by the VVT 58 and the throttle valve 26, in a cooperative manner with the valve operating angle adjusting mechanism 56.

However, if it is determined that the VVT 58, or its adjustment of the valve operating angle, has a problem, the determination of step S106 becomes "YES". In this case, the ECU 4 determines whether or not the actual valve timing VTa is larger than valve timing advanced angle limit value VTegr (in step S110). The valve timing advanced angle limit value VTegr, corresponding to reference valve timing, represents an upper limit of the valve timing advanced angle at which the engine combustion is maintained in a stable state even though each of the intake valves 2a is operated at the maximum valve operating angle VLmax. In other words, if the actual valve timing VTa exceeds the valve timing advanced angle limit value VTegr when each intake valve 2a is operated at the maximum valve operating angle VLmax, the internal EGR rate becomes excessively large due to valve overlapping between each intake valve 2a and the corresponding exhaust valve 2b, resulting in unstable combustion. The valve timing advanced angle limit value VTegr is predetermined by a test and may be a single fixed value or be varied depending on the engine operating state including the engine speed NE.

If it is determined that the actual valve timing VTa is not larger than the valve timing advanced angle limit value VTegr ("NO" in step S110), it is assumed that the combustion does not become unstable even if each of the intake valves 2a is operated at the maximum valve operating angle VLmax. Therefore, in the subsequent step S112, the target valve operating angle VLt is set to the maximum valve operating angle VLmax. Further, in step S116, the ECU 4 computes target throttle opening size TAt depending on the required load rate.

Next, in step S118, a requirement is generated such that the throttle opening size TA is controlled to become the target throttle opening size TAt in accordance with a throttle opening size control procedure, which is executed separately by the ECU 4.

Subsequently, in step S120, the motor 102 is driven to adjust the actual valve operating angle VLa to the target valve operating angle VTt. At this stage, since the target valve operating angle VTt is fixed at the maximum value VTmax, the valve operating angle of each intake valve 2a is controlled to become the maximum value and is fixed in this state. The procedure is thus completed.

In this manner, the intake air amount for each combustion chamber 12 is controlled by the throttle valve 26.

In contrast, if it is determined that the actual valve timing VTa is larger than the valve timing advanced angle limit value VTegr ("YES" in step S110), the ECU 4 sets the target valve operating angle VLt to intermediate valve operating angle VLmid (<VLmax) in step S114. The intermediate valve operating angle VLmid is a maximum valve operating value at which the engine combustion is maintained in a stable state even though the actual valve timing VTa is advanced exceeding the valve timing advanced angle limit value VTegr. The intermediate valve operating angle VLmid is predetermined by a test and may be a single fixed value or be varied depending on the engine operating state including the engine speed NE.

Further, in step S116, the ECU 4 computes the target throttle opening size TAt depending on the required load rate. Next, in step S118, a requirement is generated such that the throttle opening size TA is controlled to become the target throttle opening size TAt in accordance with the throttle opening size control procedure. Subsequently, in step S120, the motor 102 is driven to adjust the actual valve operating angle VLa to the target valve operating angle VLt. At this stage, since the target valve operating angle VLt is fixed at the intermediate valve operating angle VLmid, the valve operating angle of each intake valve 2a is controlled to become the intermediate value and is fixed in this state. The procedure is thus completed.

Thus, also in this case, the intake air amount for each combustion chamber 12 is controlled by the throttle valve 26.

Figure 16:
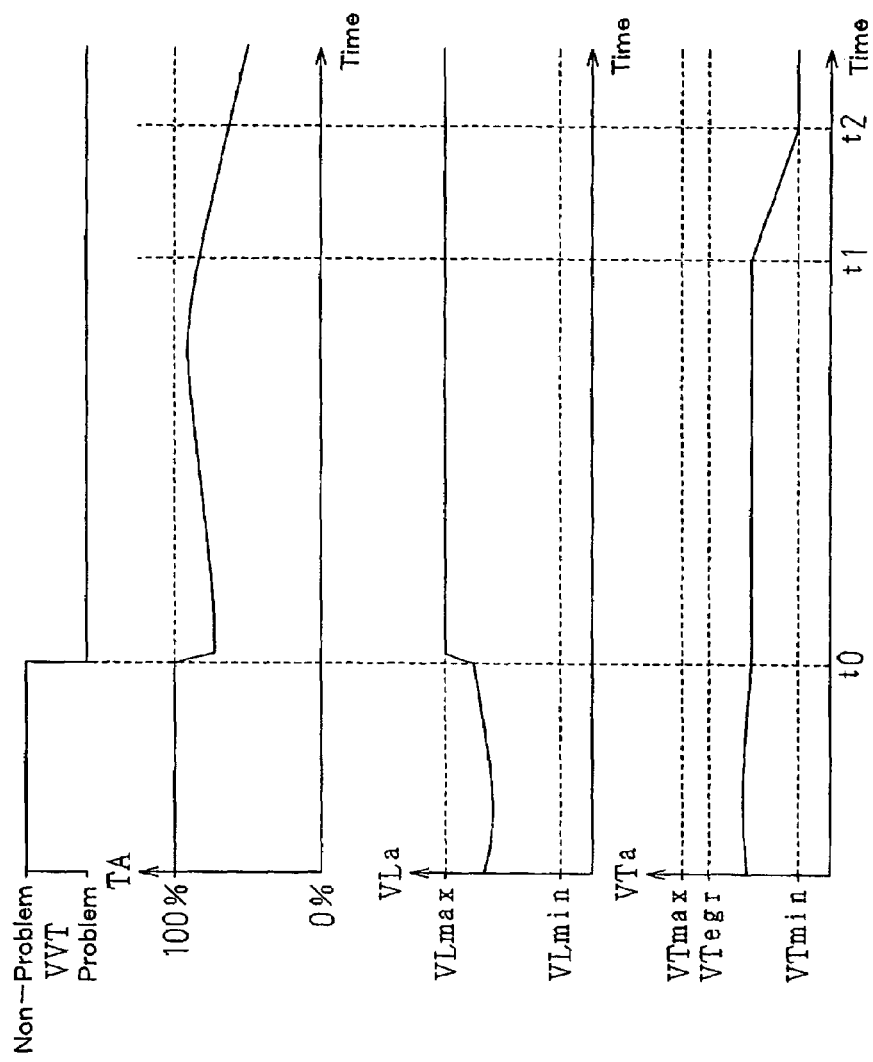
FIG. 16 is a timing chart indicating an example of the procedure of the first embodiment.
Figure 17:
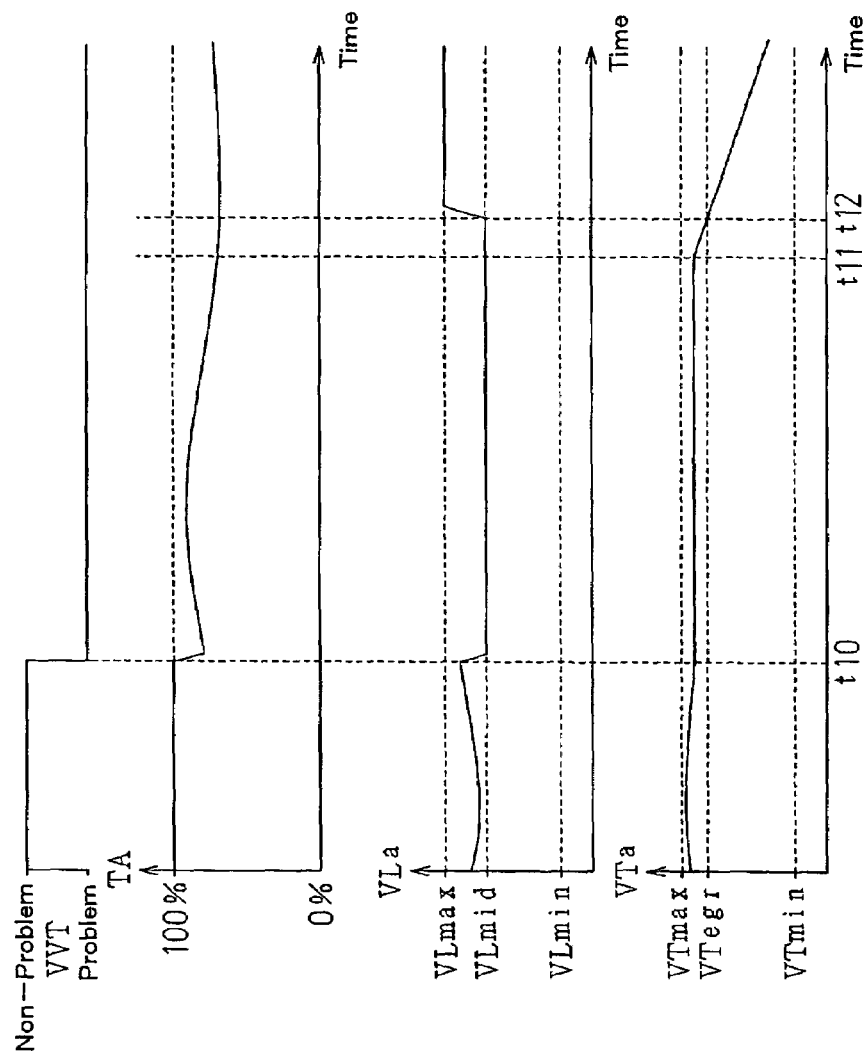
FIG. 17 is a timing chart indicating another example of the procedure of the first embodiment.

An example of the procedure of the illustrated embodiment is indicated in the timing charts of FIGS. 16 and 17. In FIG. 16, the throttle valve 26 is held in a fully open state (the throttle opening size TA=100%) until it is determined (at point t0) that the VVT 58 has a problem. In this state, the intake air amount is controlled through adjustment of the valve operating angle of each intake valve 2a by the valve operating angle adjusting mechanism 56.

When it is detected that the VVT 58 has a problem (at t0), the current actual valve timing VT is smaller than the valve timing advanced angle limit value VTegr. Therefore, the actual valve operating angle VLa is raised to the maximum valve operating angle VLmax and is fixed at this value. In contrast, the throttle opening size TA is controlled such that the intake air amount corresponds to the required load state (after t0). That is, after point t0, the intake air amount is adjusted by means of the throttle opening size TA.

In the example of FIG. 16, in accordance with the VVT safety operation, in which the VVT 58 is operated to adjust the actual valve timing VTa to the most retarded angle valve timing VTmin, the actual valve timing VTa starts to drop slowly at point t1 and reaches the most retarded valve timing VTmin at point t2. However, if the problem of the VVT 58 is a so-called non-advancing state, in which the valve timing can be retarded but cannot be advanced, the valve timing is retarded to the most retarded angle valve timing VTmin immediately after the problem is detected (at point t0). If the problem of the VVT 58 is a so-called non-retarding state in which the valve timing can be advanced but cannot be retarded, or a so-called completely fixed state in which the valve timing cannot be changed in either manners, the valve timing is maintained at the value corresponding to that of point t0 regardless of the VVT safety operation, as long as the VVT 58 is maintained in the same state.

FIG. 17 indicates a case in which the actual valve timing VTa is larger than the valve timing advanced angle limit value VTegr when it is determined that the VVT 58 has a problem (at point t10). In this case, the actual valve operating angle VLa is decreased to the intermediate valve operating angle VLmid and fixed at that value. In contrast, after point t10, the throttle opening size TA is controlled such that the intake air amount corresponds to the required load rate. That is, after point t10, the intake air amount is adjusted by means of the throttle opening size TA.

Further, in accordance with the VVT safety operation for retarding the actual valve timing VTa to the most retarded angle valve timing VTmin, the actual valve timing VTa starts to drop slowly at point t11 and reaches the valve timing advanced angle limit value VTegr at point t12. Correspondingly, the actual valve operating angle VLa is raised to the maximum valve operating angle VLmax and fixed at this value. In other words, after point t12, the intake air amount is adjusted by means of the throttle opening size TA, with each intake valve 2a maintained at the maximum valve operating angle VLmax. The actual valve timing VTa eventually reaches the most retarded angle valve timing VTmin.

If the VVT 58 is in the non-advancing state, the valve timing is retarded to the most retarded angle valve timing VTmin immediately after the problem is detected at point t10. Correspondingly, the actual valve operating angle VLa is raised to the maximum valve operating angle VLmax, immediately after point t10. In contrast, if the VVT 58 is maintained in the non-retarding state or completely fixed state, the valve timing is held in the original state corresponding to point t10, regardless of the VVT safety operation. Accordingly, the actual valve operating angle VLa is maintained at the intermediate valve operating angle VLmid.

In the above-described configuration, the valve operating angle adjusting mechanism 56 corresponds to a variable valve operating angle system, the VVT 58 corresponds to a variable valve timing system, and the variable valve mechanism 54 corresponds to a variable valve system. The throttle valve motor 24, the throttle valve 26, and the throttle opening size sensor 28 correspond to a throttle valve driving system. Further, the intake air amount control procedure (FIG. 15) and the problem detecting procedure for the VVT 58 correspond to a procedure executed by an intake air amount control apparatus. More specifically, the problem detecting procedure for the VVT 58 corresponds to a procedure executed by a valve timing problem detecting device. The steps S106 and S110 to S118 correspond to an intake air amount control procedure executed by the ECU 4 (a controller) when the VVT 58 has a problem. In addition, the maximum valve operating angle VLmax and intermediate valve operating angle VLmid each correspond to a safety angle.

The first embodiment has the following effects.

(1) When the VVT 58 has a problem ("YES" in step S106), it is determined whether or not the actual valve timing VTa is larger than the valve timing advanced angle limit value VTegr in step S110. Depending on the determination, the target valve operating angle VLt is selectively set at the intermediate valve operating angle VLmid or the maximum valve operating angle VLmax (steps S112 or S114).

In other words, when the valve timing adjustment has a problem, the target valve operating angle VLt is switched between the safety angles VLmid and VLmax depending on the actual valve timing VTa, without continuing the controlling of the actual valve operating angle VLa by the valve operating angle adjusting mechanism 56 or fixing the actual valve operating angle VLa. Each of the safety angles VLmid, VLmax is a valve operating angle of each intake valve 2a at which the combustion is maintained in a stable state at the corresponding valve timing of the intake valve 2a. With the actual valve operating angle VLa fixed at the safety angle VLmid or VLmax, the intake air amount is controlled through controlling of the throttle opening size TA.

Therefore, when the problem is detected in the VVT 58, the engine 2 is operated in the engine safety mode without destabilizing the engine combustion, regardless of the actual valve timing VTa of each intake valve 2a.

(2) Each of the safety angles VLMid, VLmax is a maximum valve operating angle of each intake valve 2a at which the internal EGR rate does not become excessive in accordance with the corresponding valve timing when the VVT 58 has a problem.

Therefore, the engine 2 is operated in the engine safety mode while preventing the combustion from becoming unstable. Further, each intake valve 2a is operated at a valve operating angle at which the maximum intake air amount becomes sufficiently large. The controlling of the intake air amount is thus relatively effective, as compared to the controlling by means of the throttle opening size TA.

(3) In the engine safety mode, the valve operating angle of each intake valve 2a is fixed. The valve operating angle adjustment of the valve operating angle adjusting mechanism 56 is thus substantially suspended. Therefore, only the throttle valve 26 needs to be controlled by the ECU 4. The controlling as a whole, or cooperative controlling, thus becomes relatively easy, reducing the load on the ECU4 during the engine safety mode. Therefore, the ECU 4 is allowed to quickly complete other procedures corresponding to the engine safety mode.

Next, a second embodiment of the present invention will be explained. In the second embodiment, the valve operating angle of each intake valve 2a is adjusted in a limited range such that the intake air amount is controlled, regardless of the problem of the VVT 58.

The hardware configuration of the second embodiment is identical with that of the first embodiment illustrated in FIGS. 1 to 14(C). Thus, the configuration of the second embodiment will be explained using the same reference numerals as those of the first embodiment. The difference between the first embodiment and the second embodiment is that the ECU 4 executes an intake air amount control procedure of FIG. 18 in the second embodiment, instead of the procedure of FIG. 15.

The intake air amount control procedure will now be described with reference to the flowchart of FIG. 18. The procedure is repeatedly executed by the ECU 4 at constant time intervals.

First, in step S202, the ECU4 reads the actual valve operating angle VLa of each intake valve 2a. The ECU 4 then reads the actual valve timing VTa of each intake valve 2a in step S204. The steps S202, S204 are identical with the steps S102, S104 of FIG. 15. Thus, the actual valve operating angle VLa and actual valve timing VTa are defined in the same manners as those of the first embodiment.

In the subsequent step S206, sub-target valve operating angle VLtx is computed in correspondence with the required load rate. The required load rate is determined in the same manner as the first embodiment, as in S108 of FIG. 15. The sub-target valve operating angle VLtx is computed using the same map and equation for determining the target valve operating angle VLt in step S108 of FIG. 15.

Next, in step S208, it is determined whether or not the VVT 58 has a problem. The determination is performed in the same manner as step S106 of FIG. 15. Further, if the determination of S208 is positive, the VVT 58 is operated such that the valve timing of each intake valve 2a becomes the most retarded angle valve timing VTmin in accordance with the VVT safety operation, as in the same manner as the first embodiment.

However, if it is determined that the VVT 58 does not have a problem in accordance with the problem detecting procedure ("No" in step S208), the sub-target valve operating angle VLtx is selected as the target valve operating angle VLt (in step S210). Further, in step S218, the motor 102 is driven such that the actual valve operating angle VLa of each intake valve 2a becomes the target valve operating angle VLt. In other words, the motor 102 is activated in accordance with the rotating direction and angle obtained in correspondence with the difference between the actual valve operating angle VLa and the target valve operating angle VLt. The procedure is thus completed.

As has been described, as long as the VVT 58 does not have a problem, the intake air amount for each combustion chamber 12 is controlled by the valve operating angle adjusting mechanism 56 of the variable valve mechanism 54. Adjustment of auxiliary factors including air intake efficiency is performed by the VVT 58 and the throttle valve 26.

In contrast, if the VVT 58 has a problem, or the determination of step S208 is "YES", it is then determined whether or not the actual valve timing VTa is larger than the valve timing advanced angle limit value VTegr in step S212. The valve timing advanced angle limit value VTegr is determined in the same manner as step S110 of FIG. 15.

If the actual valve timing VTa is determined to be equal to or smaller than the valve timing advanced angle limit value VTegr ("NO" in step S212), the engine combustion remains in a stable state even if each intake valve 2a is operated at the maximum valve operating angle VLmax. Therefore, in the subsequent step S213, the ECU 4 determines whether or not the following equation 1 is satisfied:

$$\text{Previous } VLt = VLmid < \text{Previous } VLtx \quad \text{[Equation 1]}$$

The equation 1 indicates that, in the previous control cycle, the sub-target valve operating angle VLtx was larger than the safety angle VLmid, and the target valve operating angle VLt was limited to an upper limit value, the safety angle VLmid.

If the equation 1 is not satisfied ("NO" in step S213), the actual valve operating angle VLa does not raise quickly even if the sub-target valve operating angle VLtx is selected as the target valve operating angle VLt. Therefore, in step S210, the sub-target valve operating angle VLtx is selected as the target valve operating angle VLt. Further, in step S218, the motor 102 is driven such that the actual valve operating angle VLa becomes the target valve operating angle VLt. In other words, the actual valve operating angle VLa is adjusted in the same range as when the VVT 58 does not have a problem. Accordingly, the intake air amount for each combustion chamber 12 is controlled by the valve operating angle adjusting mechanism 56 of the variable valve mechanism 54. Adjustment of auxiliary factors is performed by the throttle valve 26.

If the actual valve timing VTa is larger than the valve timing advanced angle limit value VTegr ("YES" in step S212), it is determined in step S214 whether or not the sub-target valve operating angle VLtx, which is determined in step S206, is larger than the intermediate valve operating angle VLmid. As has been explained about step S114 of FIG. 15, the intermediate valve operating angle VLmid is a maximum valve operating angle of each intake valve 2*a* at which the engine combustion is normally maintained in a stable state, even though the actual valve timing VTa of the intake valve 2*a* is advanced exceeding the valve timing advanced angle limit value VTegr.

If the sub-target valve operating angle VLtx is determined to be equal or smaller than the intermediate valve operating angle VLmid ("NO" in step S214), the combustion is maintained in a stable state if the valve operating angle of each intake valve 2*a* is controlled in accordance with the sub-target valve operating angle VLtx. Therefore, in step S210, the sub-target valve operating angle VLtx is selected as the target valve operating angle VLt. Further, in step S218, the motor 102 is controlled such that the actual valve operating angle VLa becomes the target valve operating angle VLt. In this state, the intake air amount for each combustion chamber 12 is controlled by the valve operating angle adjusting mechanism 56 of the variable valve mechanism 54. Adjustment of auxiliary factors is performed by the throttle valve 26.

If the sub-target valve operating angle VLtx is determined to be larger than the intermediate valve operating angle VLmid ("YES" in step S214), the combustion may become unstable if the valve operating angle of each intake valve 2*a* is controlled in accordance with the sub-target valve operating angle VLtx. Therefore, in step S216, the intermediate valve operating angle VLmid is selected as the target valve operating angle VLt. Further, in step S218, the motor 102 is controlled such that the actual valve operating angle VLa becomes the target valve operating angle VLt. The valve operating angle of each intake valve 2*a* is thus restricted, with the intermediate valve operating angle VLmid defined as the upper limit. Adjustment of auxiliary factors is performed by the throttle valve 26.

If the actual valve timing is determined to be equal to or smaller than the valve timing advanced angle limit value VTegr ("NO" in step S212) when the target valve operating angle VLt is fixed at the intermediate valve operating angle VLmid, step S213 is carried out. Since the valve operating angle was restricted with the intermediate valve operating angle VLmid defined as the upper limit in the previous control cycle, the determination of step S213 becomes positive, or "YES". Subsequently, in step S214, it is determined whether or not the sub-target valve operating angle VLtx computed in the current cycle is larger than the intermediate valve operating angle VLmid.

If the determination of step S214 is positive ("YES"), the target valve operating angle VLt is maintained in the restricted state as fixed at the safety angle VLmid, in step S216. Afterwards, even though the actual valve timing VTa is determined to be equal to or smaller than the valve timing advanced angle limit value VTegr ("NO" in step S212), the restricted state of the valve operating angle of each intake valve 2*a* is maintained, as long as the equation 1 is satisfied ("YES in step S213) and the sub-target valve operating angle VLtx is larger than the intermediate valve operating angle VLmid ("YES" in step S214). In this manner, the actual valve operating angle VLa is prevented from increasing quickly, when the actual valve timing VTa changes from the state larger than the valve timing advanced angle limit value VTegr to the state equal to or smaller than the valve timing advanced angle limit value VTegr.

Further, once the target valve operating angle VLtx is determined to be equal to or smaller than the intermediate valve operating angle VLmid ("NO" in step S214), the sub-target valve operating angle VLt is selected as the target valve operating angle VLt in step S210. Therefore, the equation 1 is no longer satisfied ("NO" in step S213), the target valve operating angle VLt is maintained at the sub-target valve operating angle VLtx (in step S210).

Figure 19:
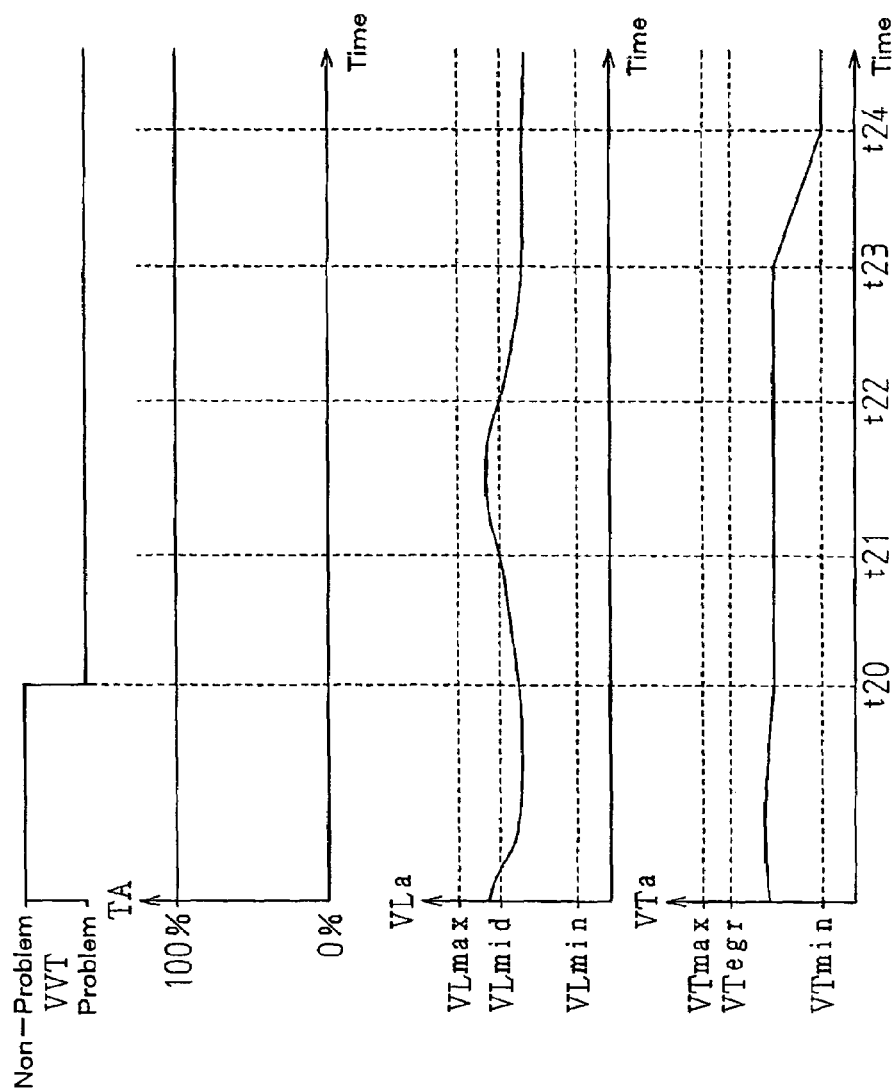
FIG. 19 is a timing chart indicating an example of the procedure of the second embodiment.
Figure 20:
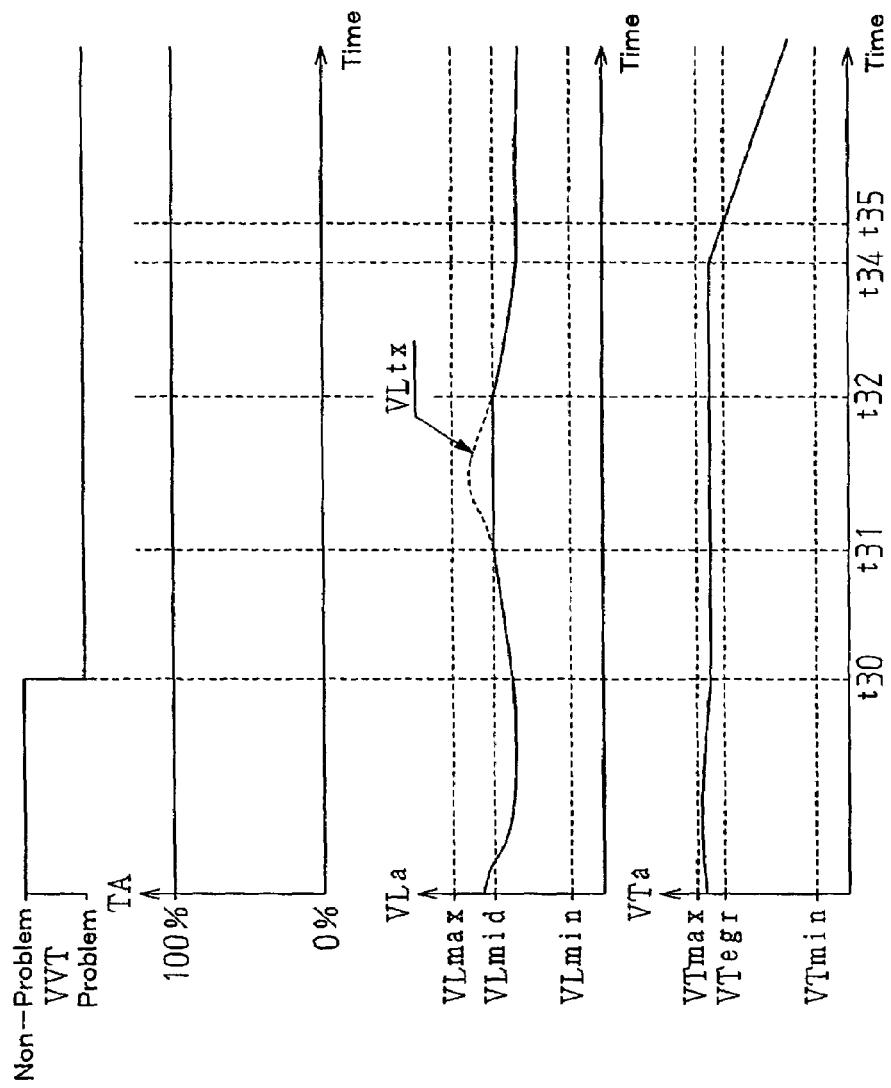
FIG. 20 is a timing chart indicating another example of the procedure of the second embodiment.
Figure 21:
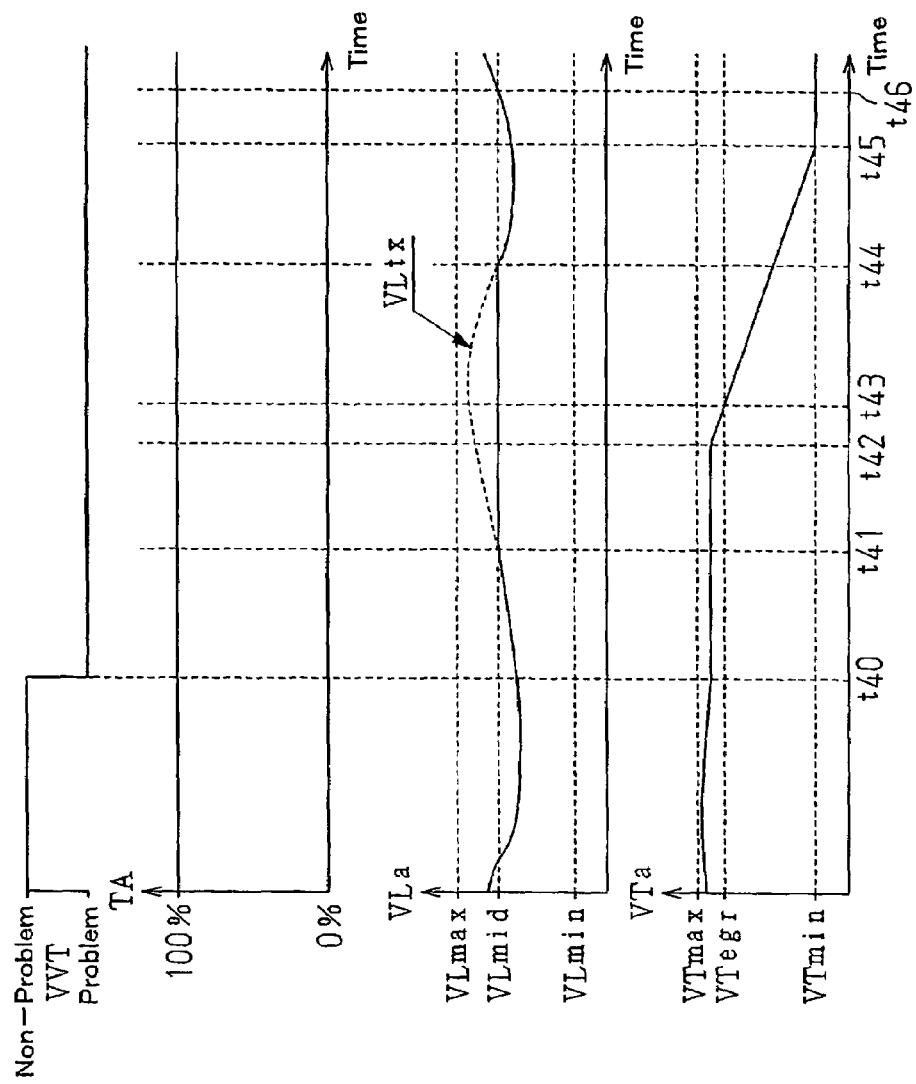
FIG. 21 is a timing chart indicating another example of the procedure of the second embodiment.

An example of the procedure of the second embodiment is indicated by the timing charts of FIGS. 19 to 21.

In the example of FIG. 19, before a problem is detected in the VVT 58 at point t20, the throttle valve 26 is held in a fully open state (the throttle opening size TA=100%). The intake air amount is thus controlled by adjusting the valve operating angle of each intake valve 2*a* in a non-limited manner by means of the valve operating angle adjusting mechanism 56.

At point t20 when the problem is detected in the VVT 58, the actual valve timing VTa is smaller than the valve timing advanced angle limit value VTegr. The combustion of the engine 2 is thus maintained in a stable manner. Therefore, as in the case in which the VVT 58 does not have a problem, the valve operating angle of each intake valve 2*a* is adjusted in a non-limited manner. In other words, the actual valve operating angle VLa (actually, the target valve operating angle VLt) is allowed to become larger than the intermediate valve operating angle VLmid from points t21 to t22. After point t22, the non-limited adjustment of the valve operating angle of each intake valve 2*a* is continuously performed.

Further, in accordance with the VVT safety operation, in which the VVT 58 is operated to retard the actual valve timing VTa to the most retarded angle valve timing VTmin, the actual valve timing VTa starts to drop slowly at point t23 and reaches the value VTmin at point t24. However, if the problem detected in the VVT 58 at point t20 corresponds to the non-advancing state, the valve timing is retarded to the most retarded angle valve timing VTmin immediately after point t20. If the problem of the VVT 58 corresponds to the non-retarding state or completely fixed state, the valve timing is fixed at the original state corresponding to point t20, regardless of the VVT safety operation, as long as the VVT 58 is held in the same state.

In the example of FIG. 20, when the problem is detected in the VVT 58 at point t30, the actual valve timing VTa is larger than the valve timing advanced angle limit value VTegr. The combustion of the engine 2 thus may become unstable. Thus, following point t30, the upper limit of the actual valve operating angle VLa (actually, the target valve operating angle VLt) is restricted to the intermediate valve operating angle VLmid from points t31 to t32.

Further, in accordance with the VVT safety operation, in which the VVT 58 is operated to retard the actual valve timing VTa to the most retarded angle valve timing VTmin, the actual valve timing VTa starts to drop slowly at point t34 and reaches the valve timing advanced angle limit value VTegr at point t35. Thus, following point t35, the upper limit of the actual valve operating angle VLa is no longer restricted to the intermediate valve operating angle VLmid. The actual valve timing VTa eventually drops to the most retarded angle valve timing VTmin.

However, if the problem detected in the VVT 58 at point t30 is the non-advancing state, the valve timing is retarded to the most retarded angle valve timing VTmin immediately after point t30. Therefore, the restriction of the actual valve operating angle VLa to the intermediate valve operating angle VLmid (from t31 to t32) does not occur.

In contrast, if the VVT 58 is maintained in the non-retarding state or completely fixed state, the valve timing is fixed in the original state corresponding to point t30, regardless of the VVT safety operation. Therefore, during the period from t31 to t32, the actual valve operating angle VLa is restricted to the intermediate valve operating angle VLmid from points t31 to t32.

In the example of FIG. 21, the actual valve timing VTa is larger than the valve timing advanced angle limit value VTegr, when it is determined that the VVT 58 has a problem at point t40. Thus, after point t41, the actual valve operating angle VLa (actually, the target valve operating angle VLt) is restricted to the intermediate valve operating angle VLmid. Further, in accordance with the VVT safety operation, the VTa starts to drop at point t42, toward the most retarded angle valve timing VTmin (corresponding to point t45), and reaches valve timing advanced angle limit value VTegr at point t43. At this stage, since the actual valve timing VLa is held in the restricted state, the restriction is continued after point t43. However, when the sub-target valve operating angle VLtx is determined to be equal to or smaller than the intermediate valve operating angle VLmid at point t44, the restriction of the actual valve operating angle VLa is discontinued. Therefore, even if the sub-target valve operating angle VLtx becomes larger than the intermediate valve operating angle VLmid after point t46, the sub-target valve operating angle VLtx is selected as the target valve operating angle VLt.

Also in this case, if the VVT 58 is in the non-advancing state, the valve timing is retarded to the most retarded valve timing VTmin immediately after the problem of the VVT 58 is detected at point t40. Thus, the restriction of the actual valve operating angle VLa to the intermediate valve operating angle VLmid from t41 to t44 does not occur.

In contrast, if the VVT 58 is maintained in the non-retarding state or completely fixed state, the valve timing remains in the original state corresponding to point t40, regardless of the VVT safety operation. Therefore, discontinuing of the restriction of the actual valve operating angle VLa at point t44 does not occur.

Figure 18:
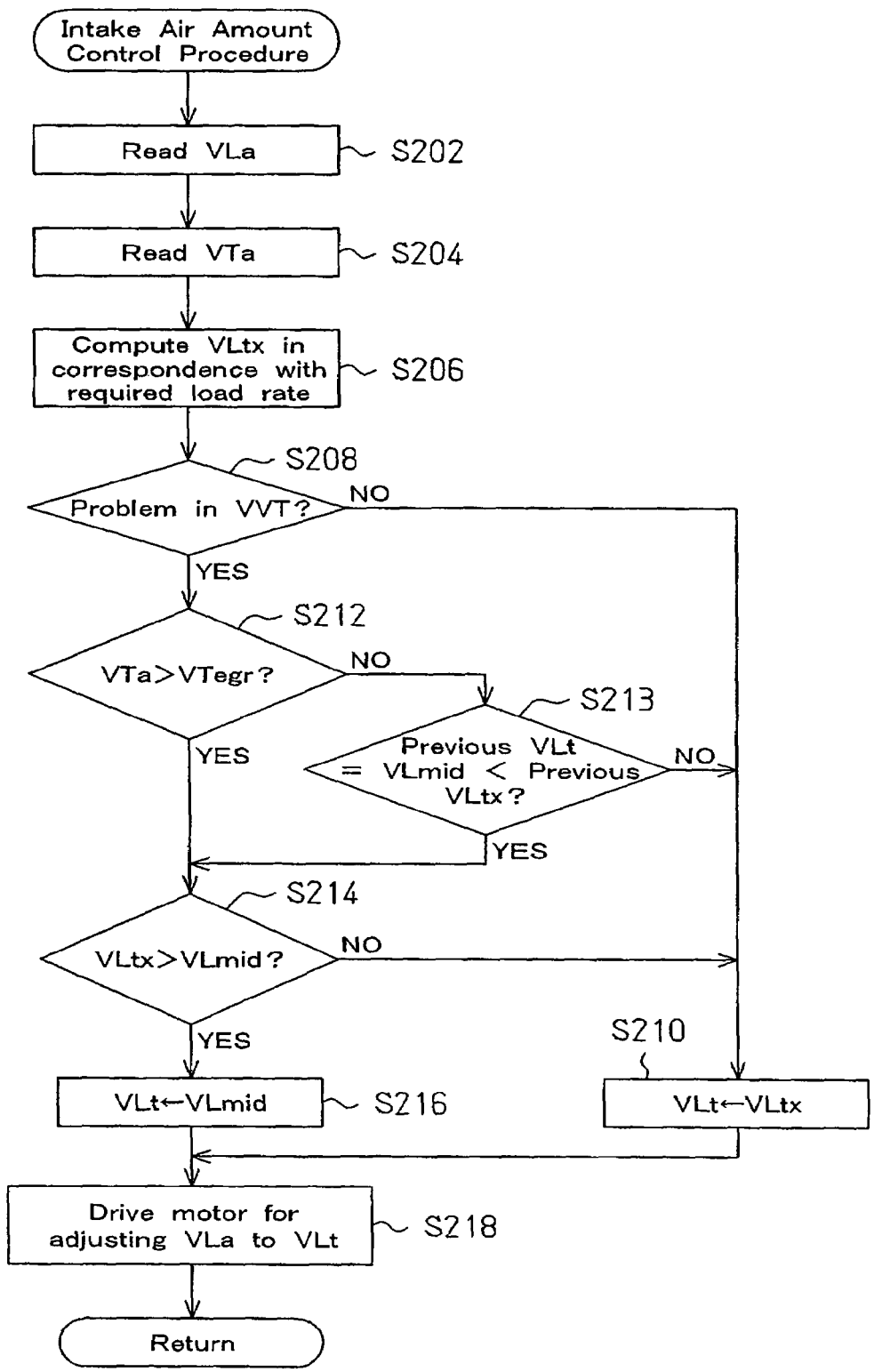
FIG. 18 is a flowchart indicating a control procedure for intake air amount according to a second embodiment of the present invention.

In the second embodiment, the intake air amount control procedure of FIG. 18 and the problem detecting procedure for the VVT58 correspond to a procedure executed by the intake air amount control apparatus. More specifically, the problem detecting procedure for the VVT 58 corresponds to a procedure executed by a valve timing problem detecting device. The steps S208 to S216 correspond to an intake air amount control procedure executed by the ECU 4 (the controller) when the VVT 58 has a problem. In addition, the valve timing advanced angle limit value VTegr corresponds to a reference valve timing, and the range of the valve operating angle equal to or smaller than the intermediate valve operating angle VLmid corresponds to a safety range.

The second embodiment has the following effects.

(1) If the VVT 58 has a problem ("YES" in step S208), it is determined whether or not the actual valve timing VTa of each intake valve 2a is larger than the valve timing advanced angle limit value VTegr (in step S212). Depending on the determination of step S212, it is determined whether or not the target valve operating angle VLt of each intake valve 2a is restricted to a value equal to or smaller than the intermediate valve operating angle VLmid. The range of the valve operating angle equal to or smaller than the intermediate valve operating angle VLmid corresponds to the safety range. More specifically, the safety range is defined such that the engine combustion is maintained in a stable state when the actual valve timing VTa is larger than the valve timing advanced angle limit value VTegr.

In other words, when the VVT 58 has a problem, the target valve operating angle VLt is restricted depending on the actual valve timing VTa of each intake valve 2a, without continuing the controlling of the actual valve operating angle VLa by the valve operating angle adjusting mechanism 56 or fixing the actual valve operating angle VLa.

Therefore, when the problem is detected in the VVT 58, the engine 2 is operated in the engine safety mode without destabilizing the combustion of the engine 2 by adjusting the actual valve operating angle VLa of each intake valve 2a, regardless of the actual valve timing VTa of the intake valve 2a.

(2) Particularly, if the actual valve timing VTa of each intake valve 2a is equal to or smaller than the valve timing advanced angle limit value VTegr, or is retarded with respect to the value VTegr, the control range of the actual valve operating angle VLa of the intake valve 2a is maintained without being reduced. This allows the engine 2 to be smoothly operated in the engine safety mode further reliably.

(3) If the target valve operating angle VLt of each intake valve 2a is restricted to be equal to or smaller than the intermediate valve operating angle VLmid and the actual valve timing VTa is determined to be equal to or smaller than the valve timing advanced angle limit value VTegr, the restriction of the target valve operating angle VLt is maintained until the sub-target valve operating angle VLtx is determined to be equal to or smaller than the value VLmid. This suppresses a rapid increase in the actual valve operating angle VLa of each intake valve 2a, maintaining drivability during the engine safety mode.

Next, other embodiments will be explained.

(a) In each of the illustrated embodiments, the valve timing and valve operating angle of each intake valve 2a are variable. However, the valve timing of each exhaust valve 2b may be varied instead of that of the intake valves 2a. In this case, if the valve timing of each exhaust valve 2b is retarded, exhaust gas is returned from an exhaust port and an exhaust passage to a corresponding combustion chamber, resulting in internal EGR. Therefore, if the valve timing of each exhaust valve 2b is adjusted, it is determined whether or not the valve timing of the exhaust valve 2b is larger than a valve timing retarded angle limit value in step S110 of FIG. 15 or step S212 of FIG. 18.

Figure 15:
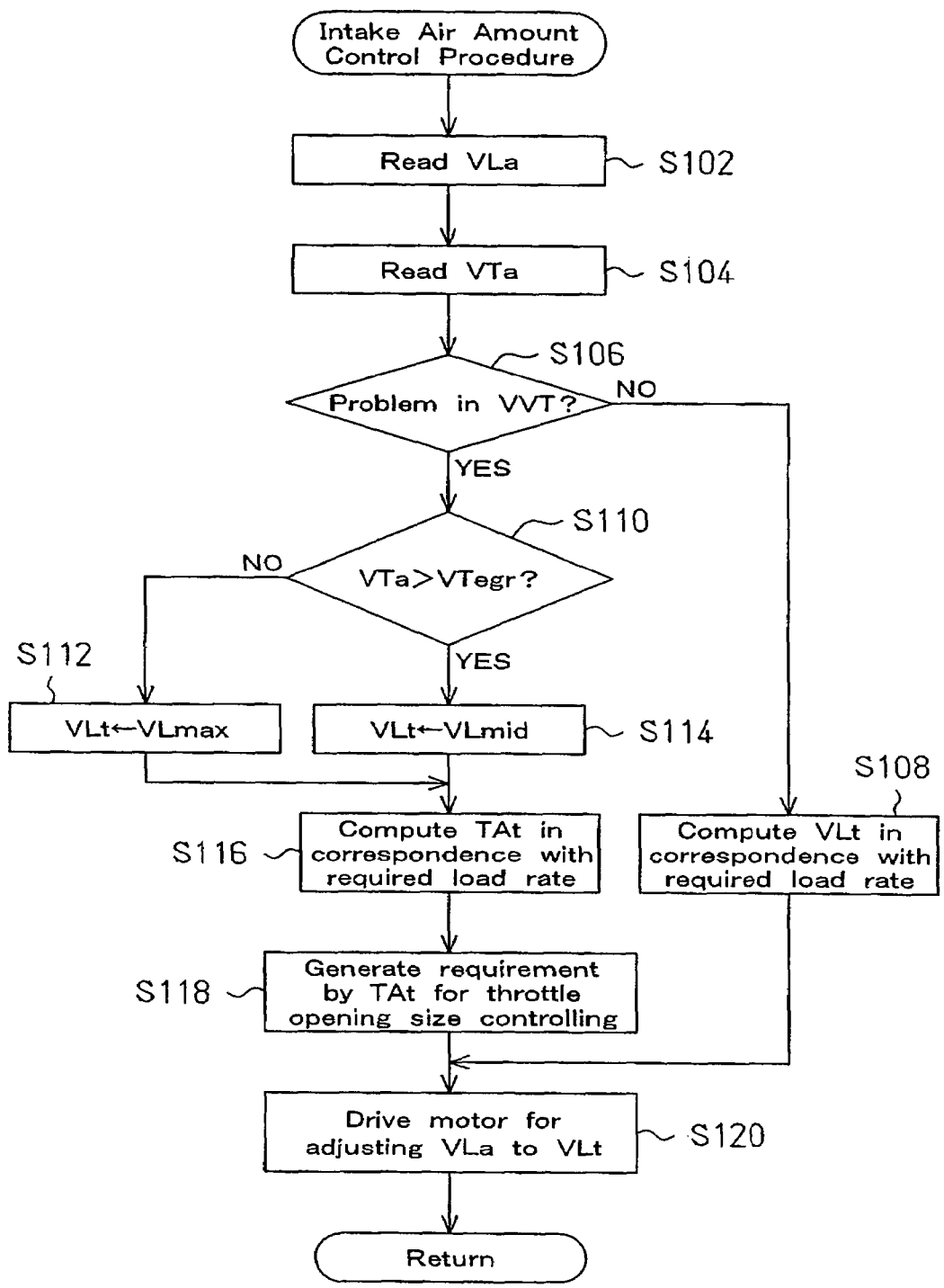
FIG. 15 is a flowchart indicating a control procedure for intake air amount, performed by the ECU of FIG. 1.

More specifically, in FIG. 15, if the valve timing of each exhaust valve 2b is larger than the valve timing retarded angle limit value, the target valve operating angle VLt of each intake valve 2a is fixed at the intermediate valve operating angle VLmid. In contrast, if the valve timing of the exhaust valve 2b is not larger than the valve timing retarded angle limit value, the target valve operating angle VLt of the intake valve 2a is fixed at the maximum valve operating angle VLmax.

In FIG. 18, if the valve timing of the exhaust valve 2b is larger than the valve timing retarded angle limit value, the target valve operating angle VLt of each intake valve 2a is restricted to be equal to or smaller than the intermediate valve operating angle VLmid. In contrast, if the valve timing of the exhaust valve 2b is not larger than the valve timing retarded angle limit value and the target valve operating angle VLt of the intake valve 2a is in a non-restricted state, the value VLt is maintained in the non-restricted state.

Alternatively, both the valve timing of the intake valves 2a and that of the exhaust valves 2b may be varied. If this is the case, the valve operating angle is controlled in correspondence with the internal EGR rate based on the total of the advanced angle value of each intake valves 2*a* and the retarded angle value of each exhaust valve 2*b*.

Figure 22:
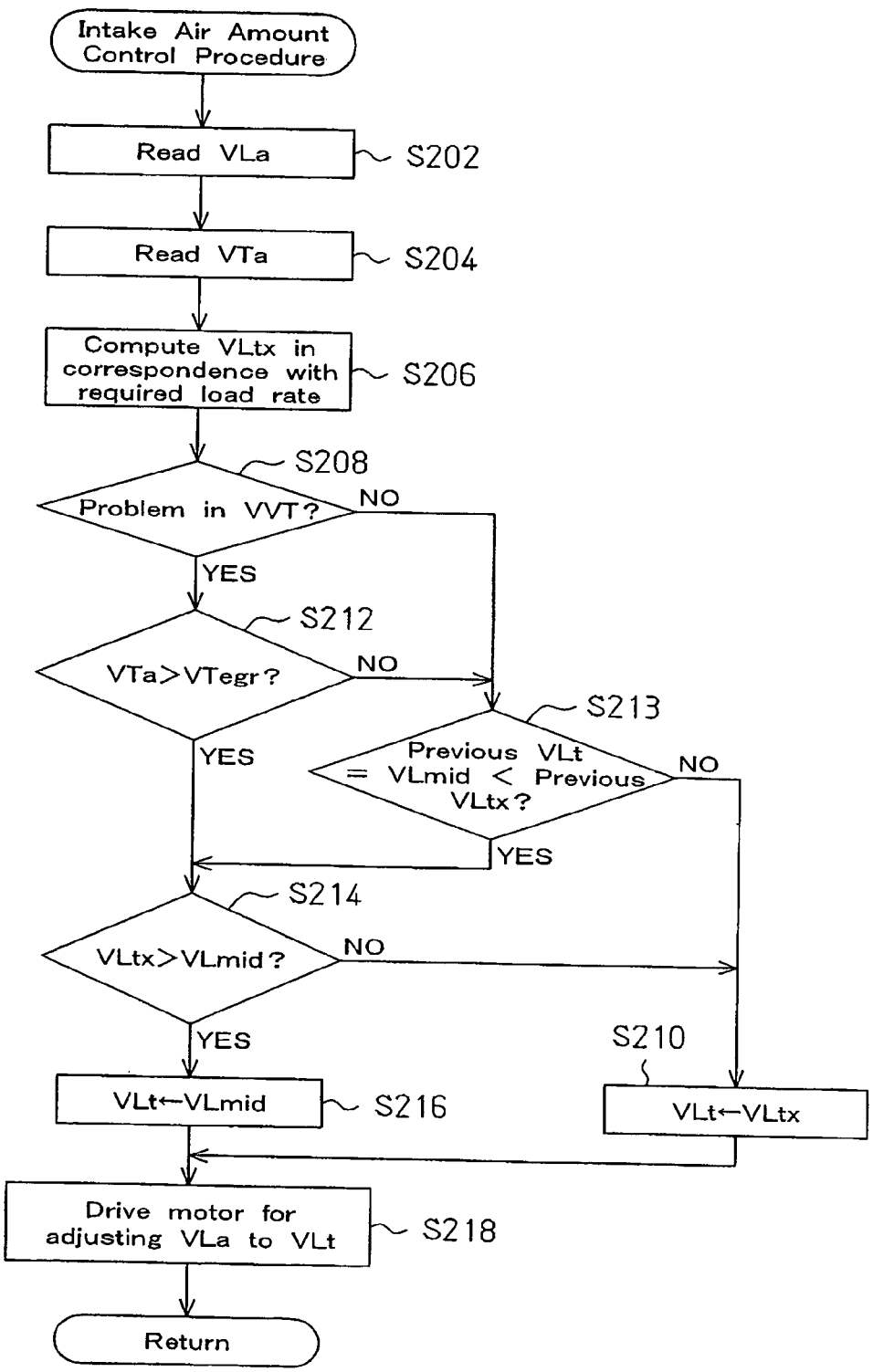
FIG. 22 is a flowchart indicating a modification of the control procedure for the intake air amount according to the second embodiment.

(b) In the second embodiment, the problem detected in the VVT 58 may be temporary. Thus, even though the problem is detected in the VVT 58, the problem detecting procedure may be repeatedly performed until the problem is no longer detected. If this is the case, the procedure may be returned to the step before the problem has been detected. That is, with reference to FIG. 22, if it is determined that the VVT 58 does not have a problem ("NO" in step S208) after the repeated problem detecting procedures, the ECU 4 proceeds to step S213. This suppresses a rapid increase in the actual valve operating angle VLa when the problem is no longer detected, with respect to the restricted state. The drivability is thus maintained in the engine safety mode. Further, in FIG. 22, steps identical to corresponding steps of FIG. 18 are given the same indices as the corresponding steps of FIG. 18.

Figure 23:
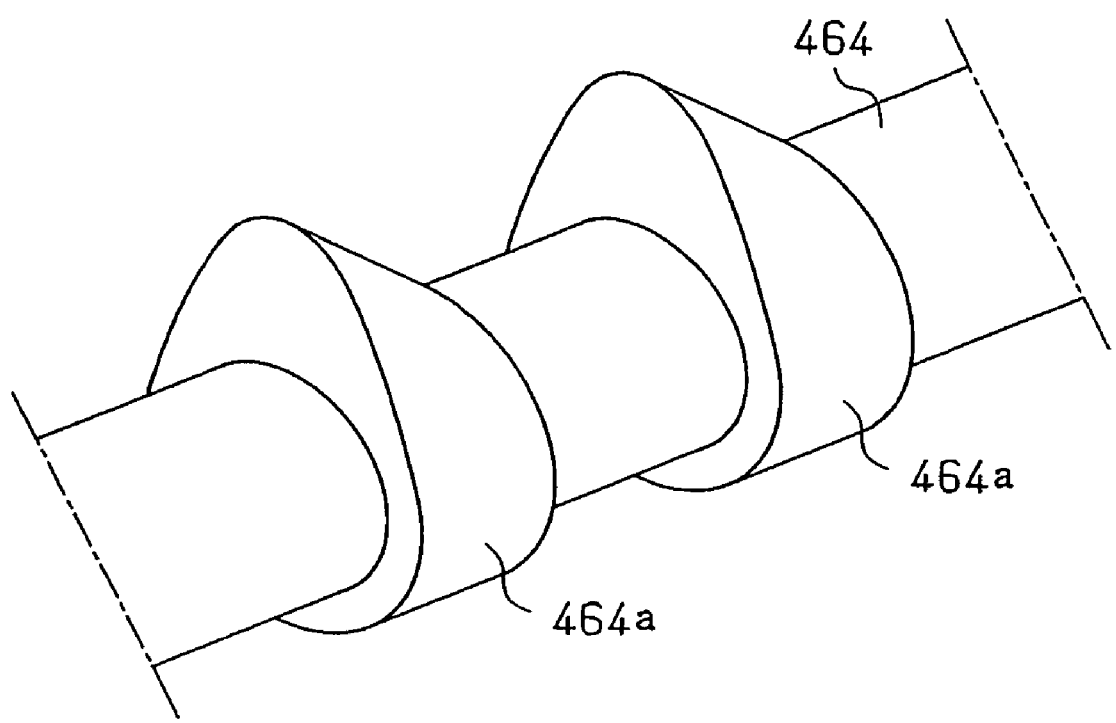
FIG. 23 is a perspective view showing a modification of the valve system.

(c) In each of the illustrated embodiments, the mediating drive mechanism 60 adjusts the valve operating angle (and the valve lift amount) through axial movement of the control shaft. However, with reference to FIGS. 23 to 24(B), the adjustment of the valve operating angle (and the valve lift amount) may be achieved without employing the mediating drive mechanism 60. More specifically, each intake cam 464*a* may be formed by a three-dimensional cam. An intake camshaft 464 functions also as a control shaft and is moved axially. A straight spline 464*b* is formed at an end of the intake camshaft 464. The intake camshaft 464 is engaged with the vane body 126 of the valve timing adjusting mechanism 58 (FIG. 14) by means of the straight spline 464*b*. This structure enables the intake camshaft 464 to move axially, while the vane body 126 is incapable of axially moving in the short cylindrical casing.

The shaft sliding mechanism 100 is configured identically with that of the first embodiment, except for that the cam frame 110 is connected to the intake camshaft 464 through a ball bearing 466. This structure enables the intake camshaft 464, which is rotated together with the crankshaft through the valve timing adjusting mechanism 58, to be moved axially without rotating the cam frame 110.

When the stopper arm 104*d* of the spiral cam mechanism 104 is held in contact with the minimum operating angle stopper 104*e*, as illustrated in FIG. 24(A), the intake camshaft 464 is located at a maximally moved position in direction L. In this state, each of the intake valves 2*a* is driven in contact with a minimum operating angle side of the corresponding intake camshaft 464*a*. This minimizes the valve operating angle. (and the valve lift amount) of each intake valve 2*a*.

If the spiral cam 108 is driven by the motor to pivot from the state of FIG. 24(A), the intake camshaft 464 is moved in direction H. Each of the intake valves 2*a* is thus gradually spaced from the minimum operating angle side of the corresponding intake cam 464*a*, gradually increasing the valve operating angle (and the valve lift amount) of each intake valve 2*a*.

When the stopper arm 104*d* of the spiral cam mechanism 104 is in contact with the maximum operating angle stopper 104*f*, as illustrated in FIG. 24(B), the intake camshaft 464 is located at a maximally moved position in direction H. In this state, each of the intake valves 2*a* is driven in contact with a maximum operating angle side of the corresponding intake camshaft 464*a*. This maximizes the valve operating angle (and the valve lift amount) of each intake valve 2*a*.

In this manner, adjustment of the valve operating angle (and the valve lift amount) of each intake valve 2*a*, which is shown in FIG. 8, is accomplished. Further, the same effects as those of the illustrated embodiments may be obtained by performing the same procedures as those of the illustrated embodiments.

Figure 25:
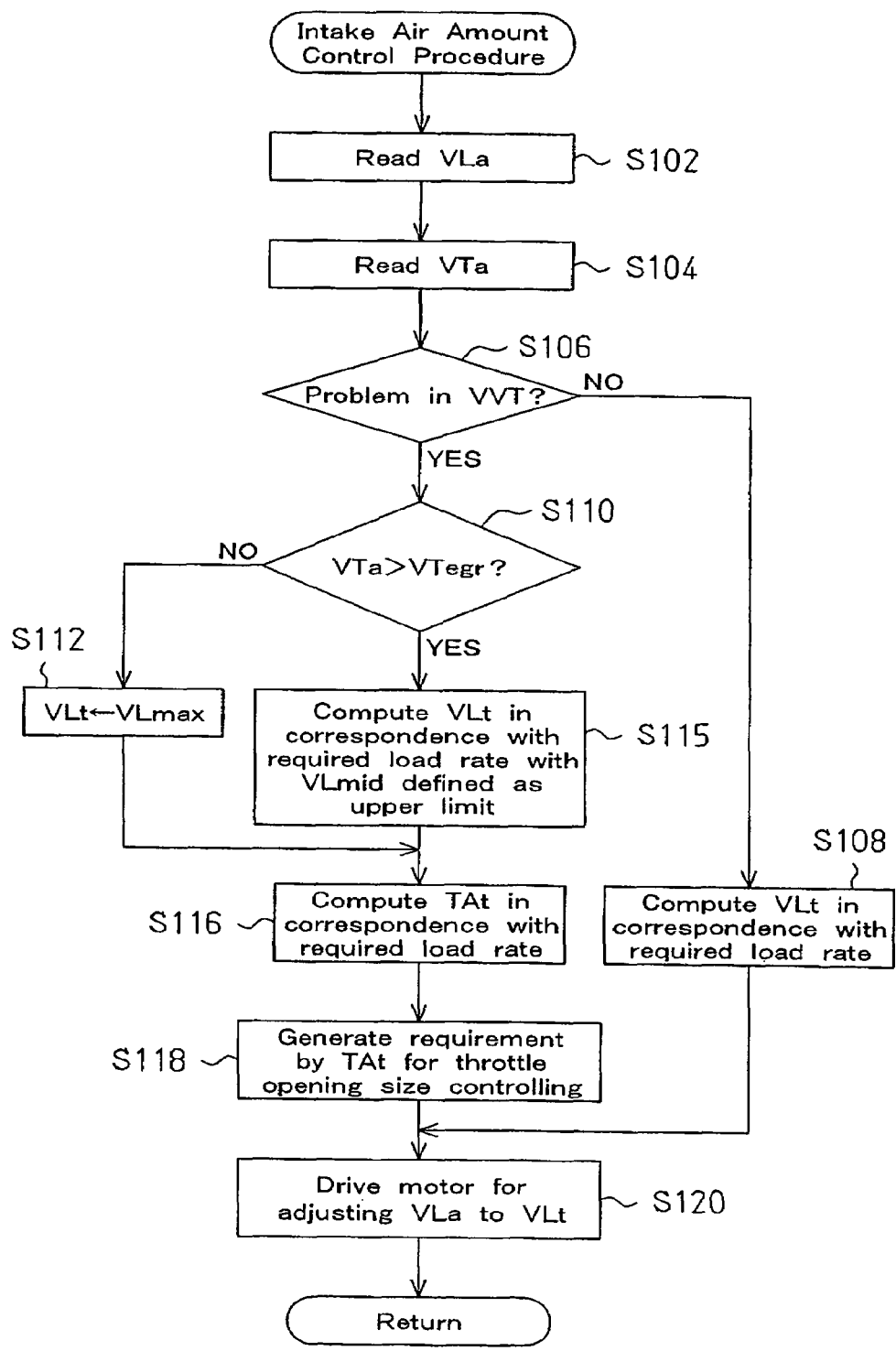
FIG. 25 is a flowchart indicating a control procedure for intake air amount according to another embodiment of the present invention.

(d) In the first embodiment, as indicated by FIG. 15, if the VVT 58 has a problem ("NO" in step S106), the actual valve operating angle VLa is fixed such that the procedure proceeds to controlling of the throttle opening size (S116, S118), regardless of whether or not the actual valve timing VTa is larger than the valve timing advanced angle limit value VTegr (regardless of whether the determination of step S110 is "YES" or "NO"). However, the procedure of FIG. 25 may be performed instead of that of FIG. 15.

In FIG. 15, the target valve operating angle VLt of each intake valve 2*a* is set at the intermediate valve operating angle VLmid, if the actual valve timing VTa is larger than the valve timing advanced angle limit value VTegr ("YES" in step S110). In contrast, in FIG. 25, if the determination of step S110 is "YES", the target valve operating angle VLt is determined in correspondence with the required load rate with the intermediate valve operating angle VLmid defined as an upper limit (in step S115). Therefore, fixing of the actual valve operating angle VLa, or proceeding to the controlling of the throttle opening size, is performed only when the actual valve timing VTa is determined to be equal to or smaller than the valve timing advanced angle limit value VTegr ("NO" in step S110), or when valve overlapping is null or relatively small and the internal EGR rate is maintained at a relatively low level.

Therefore, as long as the internal EGR rate does not become excessively high, the valve operating angle of each intake valve 2*a* remains unchanged. The intake air amount is thus controlled by the throttle valve driving system, such that the engine combustion is maintained constantly in a stable state and the engine safety mode is smoothly carried out. Further, while the cooperative controlling of the valve operating angle controlling and the throttle valve must be performed normally, only the throttle valve must be controlled in the engine safety mode. The controlling in the engine safety mode is thus relatively simple.

If the internal EGR rate is excessively high ("YES" in step S110), the valve operating angle of each intake valve 2*a* is restricted to be equal to or smaller that the intermediate valve operating angle VLmid (the safety range). In this case, the intake air amount is controlled by the throttle valve driving system. Thus, in correspondence with changes in the state of the valve timing adjustment, the valve operating angle of each intake valve 2*a* may be varied in an appropriate range. This prolongs the time for which the engine safety mode can be maintained, without causing an engine stall.

(e) In each of the illustrated embodiments, the control shaft is axially moved by the motor and the spiral cam. However, a hydraulic piston may be employed for axially moving the control shaft. Alternatively, the control shaft may be axially moved by a motor and a ball spring.

(f) The illustrated embodiments have been described in terms of the valve operating angle. However, with reference to FIG. 8, the valve operating angle (the rotating angle of the crankshaft from when the valve is opened to when the valve is closed) is a function of the valve lift amount. Accordingly, in the above description of the embodiments, the term "valve operating angle" may be replaced by the term "valve lift amount".

(g) In the illustrated embodiments, the intake valves 2a and the exhaust valves 2b are driven through the rotation of the corresponding cams. However, each of the intake valves 2a and the exhaust valves 2b may be configured by an electromagnetic valve, which is selectively opened or closed by electromagnetic force. If this is the case, for example, the valve operating angle and valve timing of each intake valve 2a, which is an electromagnetic valve, may be controlled. In this case, if a problem is detected in adjustment of the valve timing, the valve operating angle of each intake valve 2a is fixed to the safety angle such that the intake air amount is controlled by the throttle valve. Alternatively, the valve operating angle of the intake valve 2a may be adjusted in the safety range. This also ensures the effects of the illustrated embodiments.

The present examples and embodiments are to be considered as illustrative and not restrictive and the invention is not to be limited to the details given herein, but may be modified within the scope and equivalence of the appended claims.

The invention claimed is:

1. An intake air amount control method for an internal combustion engine having a variable valve system, the variable valve system including a variable valve timing system and a variable valve operating angle system, the variable valve timing system varying valve timing of at least one of an intake valve and an exhaust valve provided in the engine, the variable valve operating angle system varying a valve operating angle of the intake valve, the method comprising:
   controlling an intake air amount for the engine by adjusting the valve operating angle of the intake valve by means of the variable valve operating angle system;
   detecting a problem of the variable valve timing system; and
   controlling the variable valve operating angle system such that the valve operating angle of the intake valve is restricted to a predetermined safety range for stabilizing combustion of the engine, when the problem of the variable valve timing system is detected.

2. An intake air amount control method for an internal combustion engine having a variable valve system and a throttle valve driving system, the variable valve system including a variable valve timing system and a variable valve operating angle system, the variable valve timing system varying valve timing of at least one of an intake valve and an exhaust valve provided in the engine, the variable valve operating angle system varying a valve operating angle of the intake valve, the throttle valve driving system adjusting an opening size of a throttle valve disposed in an intake system of the engine, the method comprising:
   controlling an intake air amount for the engine by adjusting the valve operating angle of the intake valve by means of the variable valve operating angle system, when the engine is operated normally;
   detecting a problem of the variable valve timing system;
   controlling the variable valve operating angle system such that the valve operating angle of the intake valve is fixed to a predetermined safety angle for stabilizing combustion of the engine, when the problem of the variable valve timing system is detected; and
   enabling the throttle valve driving system to control the intake air amount, when the problem of the variable valve timing system is detected.

3. An intake air amount control apparatus for an internal combustion engine having a variable valve system, the variable valve system including a variable valve timing system and a variable valve operating angle system, the variable valve timing system varying valve timing of at least one of an intake valve and an exhaust valve provided in the engine, the variable valve operating angle system varying a valve operating angle of the intake valve and controlling an intake air amount for the engine by adjusting the valve operating angle of the intake valve, the apparatus comprising:
   a problem detecting device for detecting a problem of the variable valve timing system; and
   a controller, wherein, when the problem of the variable valve timing system is detected, the controller controls the variable valve operating angle system such that the valve operating angle of the intake valve is restricted to a predetermined safety range for stabilizing combustion of the engine.

4. The apparatus according to claim 3, wherein the safety range corresponds to a range of the valve operating angle at which the internal EGR rate does not become excessive regardless of the valve timing brought about by the variable valve timing system.

5. The apparatus according to claim 3, wherein, when the problem of the variable valve timing system is detected, the controller restricts the valve operating angle of the intake valve to the safety range if the valve timing of the intake valve is advanced with respect to a predetermined reference valve timing but does not restrict the valve operating angle of the intake valve to the safety range if the valve timing of the intake valve is retarded with respect to the reference valve timing.

6. The apparatus according to claim 5, wherein the reference valve timing corresponds to an upper limit of an advanced angle of the valve timing at which an internal EGR rate does not become excessive if the valve operating angle of the intake valve becomes a predetermined maximum value.

7. The apparatus according to claim 5, wherein the safety range corresponds to a range of the valve operating angle at which the internal EGR rate does not become excessive if the valve timing of the intake valve is advanced with respect to the reference valve timing.

8. An intake air amount control apparatus for an internal combustion engine having a variable valve system and a throttle valve driving system, the variable valve system including a variable valve timing system and a variable valve operating angle system, the variable valve timing system varying valve timing of at least one of an intake valve and an exhaust valve provided in the engine, the variable valve operating angle system varying a valve operating angle of the intake valve, the throttle valve driving system adjusting an opening size of a throttle valve disposed in an intake system of the engine, the variable valve operating angle system controlling an intake air amount for the engine by adjusting the valve operating angle of the intake valve when the engine is operated normally, the apparatus comprising:
   a problem detecting device for detecting a problem of the variable valve timing system; and
   a controller, wherein, when the problem of the variable valve timing system is detected, the controller controls the variable valve operating angle system such that the valve operating angle of the intake valve is fixed to a predetermined safety angle for stabilizing combustion of the engine, and enables the throttle valve driving system to control the intake air amount.

9. The apparatus according to claim 8, wherein the controller selects the safety angle in accordance with the current valve timing brought about by the variable valve timing system, such that the safety angle becomes a maximum value of the valve operating angle range in which the internal EGR rate does not become excessive.

10. The apparatus according to claim 8, wherein the controller operates the variable valve operating angle system to fix the valve operating angle at the safety angle unless the problem of the variable valve timing system is detected and the problem leads to an excessive internal EGR rate.

11. The apparatus according to claim 10, wherein the controller operates the variable valve operating angle system to fix the valve operating angle at the safety angle only when the problem of the variable valve timing system is detected and the valve timing of the intake valve is retarded with respect to a predetermined reference valve timing.

12. The apparatus according to claim 8, wherein the controller selects the safety angle in accordance with the current valve timing brought about by the variable valve timing system, such that the internal EGR rate does not become excessive.

13. The apparatus according to claim 12, wherein the controller sets the safety angle at a relatively small value when the valve timing of the intake valve is advanced with respect to a predetermined reference valve timing, as compared to when the valve timing of the intake valve is retarded with respect to the reference valve timing.

14. The apparatus according to claim 13, wherein the reference valve timing corresponds to an upper limit of an advanced angle of the valve timing at which the internal EGR rate does not become excessive if the valve operating angle of the intake valve becomes a predetermined maximum value.

15. The apparatus according to claim 14, wherein the controller sets the safety angle at the maximum value of the valve operating angle when the valve timing of the intake valve is retarded with respect to the reference valve timing.

\* \* \* \* \*